US007307613B2

(12) United States Patent
Teshirogi et al.

(10) Patent No.: US 7,307,613 B2
(45) Date of Patent: Dec. 11, 2007

(54) VIDEO DATA TRANSFER METHOD, DISPLAY CONTROL CIRCUIT, AND LIQUID CRYSTAL DISPLAY DEVICE

(75) Inventors: Yoshiyuki Teshirogi, Kanagawa (JP); Takashi Nose, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 248 days.

(21) Appl. No.: 10/619,452

(22) Filed: Jul. 16, 2003

(65) Prior Publication Data

US 2004/0012583 A1 Jan. 22, 2004

(30) Foreign Application Priority Data

Jul. 19, 2002 (JP) ............................. 2002-211802

(51) Int. Cl.
*G09G 3/36* (2006.01)
*G06F 3/038* (2006.01)

(52) U.S. Cl. ........................................ 345/98; 345/204

(58) Field of Classification Search .......... 345/87-100, 345/204, 601; 365/189.04-5; 348/571
See application file for complete search history.

(56) References Cited

U.S. PATENT DOCUMENTS 4,823,120 A * 4/1989 Thompson et al. ......... 345/601
5,712,651 A * 1/1998 Tomiyasu .................... 345/88
6,335,718 B1 * 1/2002 Hong et al. .................... 345/98
6,550,026 B1 * 4/2003 Wright et al. .......... 365/189.04
6,628,256 B2 * 9/2003 Nishimura ................... 345/96
6,999,352 B2 * 2/2006 Yoshida et al. ........ 365/189.05
7,136,110 B2 * 11/2006 Honma et al. ............. 348/571

FOREIGN PATENT DOCUMENTS

JP 2001-356737 A 12/2001

* cited by examiner

*Primary Examiner*—Sumati Lefkowitz
*Assistant Examiner*—William L Boddie
(74) *Attorney, Agent, or Firm*—Sughrue Mion Pllc.

(57) ABSTRACT

In a technique of partially serializing video data to transfer it from a display control circuit to a signal-line driving circuit such as a source driver, data comparisons ① and ② in the data order after serialization are made sequentially in a stage of parallel data prior to making a parallel-to-serial conversion of the video data, and determination is made as to whether or not the bit inversion number of the data is more than half to take a control of an inversion/noninversion for the transfer data. An operational speed of a comparator, an inversion/noninversion determination circuit, etc. can be reduced as compared with the case in which a control is taken of the inversion/noninversion for the data of which an operation speed became high by partially serializing the video data.

6 Claims, 12 Drawing Sheets

* IN THIS EXAMPLE, INPUT VIDEO DATA HAS 24 BITS (EACH OF R, G, AND B HAS 8 BITS)
* INVERSION SIGNAL (S0) IS INVERSION SIGNAL FOR ODD BIT, AND INVERSION SIGNAL (S1) IS INVERSION SIGNAL FOR EVEN BIT.
* POINTS (a) TO (f) ARE OBSERVATION POINT OF TIMING CHART OF FIG.2.
* EACH F/F HAS CLOCK AND RESET TERMINAL

* IN THIS EXAMPLE, INPUT VIDEO DATA HAS 24 BITS (EACH OF R, G, AND B HAS 8 BITS)
* INVERSION SIGNAL (S0) IS INVERSION SIGNAL FOR ODD BIT, AND INVERSION SIGNAL (S1) IS INVERSION SIGNAL FOR EVEN BIT.
* POINTS (a) TO (f) ARE OBSERVATION POINT OF TIMING CHART OF FIG.2.
* EACH F/F HAS CLOCK AND RESET TERMINAL

TIME →

ODD BIT

| | | | | | | | | | | | | | | | | |
|---|---|---|---|---|---|---|---|---|---|---|---|---|---|---|---|---|
| $R_7$ | 0 | 1 | 1 | 1 | 0 | 1 | 0 | 0 | 0 | 1 | 1 | 0 | 0 | 1 | 0 | 1 |
| $R_5$ | 0 | 0 | 1 | 1 | 1 | 1 | 1 | 1 | 0 | 1 | 0 | 0 | 1 | 1 | 0 | 1 |
| $R_3$ | 0 | 1 | 0 | 1 | 0 | 1 | 1 | 0 | 0 | 0 | 1 | 1 | 1 | 1 | 1 | 1 |
| $R_1$ | 0 | 0 | 1 | 0 | 1 | 1 | 0 | 0 | 0 | 1 | 1 | 1 | 1 | 1 | 1 | 0 |
| $G_7$ | 0 | 0 | 1 | 1 | 0 | 1 | 1 | 1 | 1 | 0 | 0 | 1 | 1 | 0 | 1 | 0 |
| $G_5$ | 0 | 0 | 1 | 0 | 1 | 1 | 1 | 0 | 0 | 0 | 1 | 1 | 0 | 1 | 0 | 0 |
| $G_3$ | 0 | 1 | 0 | 0 | 1 | 1 | 0 | 0 | 0 | 1 | 1 | 1 | 1 | 1 | 0 | 0 |
| $G_1$ | 0 | 0 | 1 | 1 | 0 | 1 | 1 | 1 | 1 | 0 | 0 | 0 | 0 | 1 | 0 | 1 |
| $B_7$ | 0 | 0 | 0 | 1 | 0 | 1 | 1 | 1 | 0 | 0 | 0 | 1 | 1 | 1 | 1 | 1 |
| $B_5$ | 0 | 1 | 1 | 1 | 1 | 1 | 1 | 0 | 0 | 1 | 1 | 1 | 1 | 1 | 0 | 0 |
| $B_3$ | 0 | 0 | 1 | 1 | 1 | 1 | 0 | 0 | 1 | 1 | 0 | 0 | 1 | 1 | 0 | 0 |
| $B_1$ | 0 | 0 | 0 | 1 | 0 | 1 | 1 | 0 | 0 | 0 | 0 | 1 | 0 | 0 | 1 | 0 |

EVEN BIT

| | | | | | | | | | | | | | | | | |
|---|---|---|---|---|---|---|---|---|---|---|---|---|---|---|---|---|
| $R_6$ | 0 | 1 | 0 | 0 | 0 | 1 | 1 | 0 | 0 | 1 | 1 | 0 | 0 | 0 | 1 | 0 |
| $R_4$ | 0 | 1 | 1 | 0 | 1 | 1 | 0 | 1 | 0 | 0 | 1 | 1 | 1 | 1 | 0 | 1 |
| $R_2$ | 0 | 0 | 0 | 1 | 0 | 1 | 0 | 1 | 1 | 0 | 0 | 1 | 1 | 1 | 0 | 1 |
| $R_0$ | 0 | 1 | 1 | 0 | 1 | 1 | 1 | 1 | 0 | 0 | 0 | 1 | 1 | 0 | 1 | 0 |
| $G_6$ | 0 | 0 | 1 | 0 | 1 | 1 | 1 | 0 | 0 | 0 | 1 | 1 | 1 | 1 | 0 | 1 |
| $G_4$ | 0 | 0 | 0 | 0 | 1 | 1 | 0 | 0 | 0 | 1 | 1 | 0 | 0 | 1 | 1 | 0 |
| $G_2$ | 0 | 1 | 0 | 0 | 0 | 1 | 1 | 0 | 0 | 0 | 1 | 1 | 1 | 0 | 0 | 1 |
| $G_0$ | 0 | 1 | 1 | 1 | 1 | 1 | 0 | 1 | 1 | 1 | 0 | 0 | 0 | 0 | 0 | 1 |
| $B_6$ | 0 | 1 | 1 | 1 | 1 | 1 | 0 | 1 | 0 | 0 | 0 | 1 | 1 | 0 | 0 | 0 |
| $B_4$ | 0 | 0 | 0 | 0 | 1 | 1 | 1 | 0 | 0 | 0 | 0 | 1 | 1 | 1 | 1 | 1 |
| $B_2$ | 0 | 1 | 0 | 0 | 1 | 1 | 1 | 1 | 1 | 0 | 0 | 1 | 1 | 1 | 0 | 1 |
| $B_0$ | 0 | 0 | 1 | 0 | 0 | 1 | 1 | 0 | 0 | 1 | 1 | 0 | 0 | 1 | 0 | 0 |

(g) (OUTPUT ODD BIT)

| | | | | | | | | | | | | | | | | |
|---|---|---|---|---|---|---|---|---|---|---|---|---|---|---|---|---|
| $R_7$ | 0 | 0 | 1 | 0 | 0 | 0 | 1 | 0 | 0 | 0 | 0 | 0 | 1 | 1 | 0 | 1 |
| $R_5$ | 0 | 0 | 0 | 0 | 0 | 1 | 1 | 1 | 1 | 0 | 0 | 1 | 1 | 0 | 0 | 1 |
| $R_3$ | 0 | 0 | 1 | 1 | 0 | 0 | 1 | 1 | 0 | 0 | 1 | 0 | 0 | 0 | 0 | 0 |
| $R_1$ | 0 | 0 | 0 | 0 | 1 | 1 | 1 | 0 | 0 | 0 | 0 | 0 | 0 | 0 | 0 | 0 |
| $G_7$ | 0 | 0 | 0 | 0 | 0 | 0 | 1 | 1 | 1 | 1 | 1 | 1 | 0 | 0 | 1 | 0 |
| $G_5$ | 0 | 0 | 0 | 0 | 1 | 1 | 1 | 1 | 0 | 0 | 1 | 0 | 0 | 1 | 0 | 1 |
| $G_3$ | 0 | 0 | 1 | 1 | 1 | 1 | 1 | 0 | 0 | 0 | 0 | 0 | 0 | 0 | 0 | 1 |
| $G_1$ | 0 | 0 | 0 | 0 | 0 | 0 | 1 | 1 | 1 | 1 | 1 | 1 | 1 | 1 | 0 | 1 |
| $B_7$ | 0 | 0 | 0 | 1 | 0 | 0 | 1 | 1 | 1 | 0 | 1 | 1 | 0 | 0 | 0 | 0 |
| $B_5$ | 0 | 0 | 1 | 0 | 0 | 1 | 1 | 1 | 0 | 0 | 0 | 0 | 0 | 0 | 0 | 1 |
| $B_3$ | 0 | 0 | 0 | 0 | 0 | 1 | 1 | 0 | 0 | 1 | 0 | 1 | 1 | 0 | 0 | 1 |
| $B_1$ | 0 | 0 | 0 | 1 | 0 | 0 | 1 | 1 | 0 | 0 | 1 | 1 | 0 | 1 | 1 | 0 |

t1 t2 t3 t4 ...

TIME →

| | | | | | | | | | | | | | | | | | | |
|---|---|---|---|---|---|---|---|---|---|---|---|---|---|---|---|---|---|---|
| ODD BIT A | $R_7$ | 0 | 1 | 1 | 1 | 0 | 1 | 0 | 0 | 0 | 1 | 1 | 0 | 0 | 1 | 0 | 1 | |
| | $R_3$ | 0 | 1 | 0 | 1 | 0 | 1 | 1 | 0 | 0 | 0 | 1 | 1 | 1 | 1 | 1 | 1 | |
| | $G_7$ | 0 | 0 | 1 | 1 | 0 | 1 | 1 | 1 | 1 | 0 | 0 | 1 | 1 | 0 | 1 | 0 | ---------- |
| | $G_3$ | 0 | 1 | 0 | 0 | 1 | 1 | 0 | 0 | 0 | 1 | 1 | 1 | 1 | 1 | 0 | 0 | |
| | $B_7$ | 0 | 0 | 0 | 1 | 0 | 1 | 1 | 1 | 0 | 0 | 0 | 1 | 1 | 1 | 1 | 1 | |
| | $B_3$ | 0 | 0 | 1 | 1 | 1 | 1 | 0 | 0 | 1 | 1 | 0 | 0 | 1 | 1 | 0 | 0 | |
| EVEN BIT A | $R_6$ | 0 | 1 | 0 | 0 | 0 | 1 | 1 | 0 | 0 | 1 | 1 | 0 | 0 | 0 | 1 | 0 | |
| | $R_2$ | 0 | 0 | 0 | 1 | 0 | 1 | 0 | 1 | 1 | 0 | 0 | 1 | 1 | 1 | 0 | 1 | |
| | $G_6$ | 0 | 0 | 1 | 0 | 1 | 1 | 1 | 0 | 0 | 0 | 1 | 1 | 1 | 1 | 0 | 1 | ---------- |
| | $G_2$ | 0 | 1 | 0 | 0 | 0 | 1 | 1 | 0 | 0 | 0 | 1 | 1 | 1 | 0 | 0 | 1 | |
| | $B_6$ | 0 | 1 | 1 | 1 | 1 | 1 | 0 | 1 | 0 | 0 | 0 | 1 | 1 | 0 | 0 | 0 | |
| | $B_2$ | 0 | 1 | 0 | 0 | 1 | 1 | 1 | 1 | 1 | 0 | 0 | 1 | 1 | 1 | 0 | 1 | |
| ODD BIT B | $R_5$ | 0 | 0 | 1 | 1 | 1 | 1 | 1 | 1 | 0 | 1 | 0 | 0 | 1 | 1 | 0 | 1 | |
| | $R_1$ | 0 | 0 | 1 | 0 | 1 | 1 | 0 | 0 | 0 | 1 | 1 | 1 | 1 | 1 | 1 | 0 | |
| | $G_5$ | 0 | 0 | 1 | 0 | 1 | 1 | 1 | 0 | 0 | 0 | 1 | 1 | 0 | 1 | 0 | 0 | ---------- |
| | $G_1$ | 0 | 0 | 1 | 1 | 0 | 1 | 1 | 1 | 1 | 0 | 0 | 0 | 0 | 1 | 0 | 1 | |
| | $B_5$ | 0 | 1 | 1 | 1 | 1 | 1 | 1 | 0 | 0 | 1 | 1 | 1 | 1 | 1 | 0 | 0 | |
| | $B_1$ | 0 | 0 | 0 | 1 | 0 | 1 | 1 | 0 | 0 | 0 | 0 | 1 | 0 | 0 | 1 | 0 | |
| EVEN BIT B | $R_4$ | 0 | 1 | 1 | 0 | 1 | 1 | 0 | 1 | 0 | 0 | 1 | 1 | 1 | 1 | 0 | 1 | |
| | $R_0$ | 0 | 1 | 1 | 0 | 1 | 1 | 1 | 1 | 0 | 0 | 0 | 1 | 1 | 0 | 1 | 0 | |
| | $G_4$ | 0 | 0 | 0 | 0 | 1 | 1 | 0 | 0 | 0 | 1 | 1 | 0 | 0 | 1 | 1 | 0 | ---------- |
| | $G_0$ | 0 | 1 | 1 | 1 | 1 | 1 | 0 | 1 | 1 | 1 | 0 | 0 | 0 | 0 | 0 | 1 | |
| | $B_4$ | 0 | 0 | 0 | 0 | 1 | 1 | 1 | 0 | 0 | 0 | 0 | 1 | 1 | 1 | 1 | 1 | |
| | $B_0$ | 0 | 0 | 1 | 0 | 0 | 1 | 1 | 0 | 0 | 1 | 1 | 0 | 0 | 1 | 0 | 0 | |

| | | | | | | | | | | | | | | | | | | |
|---|---|---|---|---|---|---|---|---|---|---|---|---|---|---|---|---|---|---|
| (m) (OUTPUT ODD BIT A) | $R_7$ | 0 | 0 | 0 | 0 | 0 | 1 | 0 | 1 | 1 | 1 | 0 | 0 | 0 | 0 | 0 | 1 | |
| | $R_3$ | 0 | 0 | 0 | 1 | 0 | 1 | 0 | 0 | 1 | 1 | 1 | 0 | 1 | 1 | 0 | 0 | |
| | $G_7$ | 0 | 0 | 1 | 0 | 0 | 1 | 0 | 0 | 0 | 0 | 1 | 1 | 1 | 1 | 1 | 0 | ---------- |
| | $G_3$ | 0 | 0 | 0 | 1 | 1 | 0 | 0 | 1 | 1 | 1 | 0 | 0 | 1 | 1 | 0 | 1 | |
| | $B_7$ | 0 | 0 | 1 | 1 | 0 | 1 | 0 | 0 | 0 | 1 | 1 | 1 | 1 | 1 | 0 | 0 | |
| | $B_3$ | 0 | 0 | 1 | 0 | 0 | 0 | 0 | 1 | 1 | 0 | 0 | 1 | 0 | 1 | 0 | 1 | |
| | | t1 | t2 | t3 | t4 | ··· | | | | | | | | | | | | |

VIDEO DATA TRANSFER METHOD, DISPLAY CONTROL CIRCUIT, AND LIQUID CRYSTAL DISPLAY DEVICE

BACKGROUND OF THE INVENTION

The present invention relates to a control of a liquid crystal display, and more particular to a liquid crystal display device having a display control circuit for transferring video data to a liquid crystal display panel.

In recent years, high definition of a display image of a computer, a television, etc. has been enhanced, and in the liquid crystal display device for treating video date thereof (image data), the data bus number and the data transfer speed have been increased year by year with an increase in the pixel number and the gradation number.

FIG. 8 is a diagram illustrating a system configuration of the conventional liquid crystal display device. It is composed of an image rendering device 2A such as a personal computer (PC) and a liquid crystal display device 1A, and the liquid crystal display device 1A is configured of: a display control circuit (timing controller) 11A for inputting video data such as parallel data, synchronous data associated with the above video data, etc. from the image rendering device 2A to output the predetermined video data and control signal to an internal bus; a signal-line driving circuit (source driver) 14A for inputting a signal-side control signal that is composed of the video data from the display control circuit 11A and known synchronous signals (HCK: a timing signal for incorporating the video data, STH: a horizontal start pulse, etc.), and a reference gradation voltage from a reference gradation voltage generation circuit 12A to output the video data as a gradation voltage to a signal line; a scan-line driving circuit (gate driver) 13A for inputting a scan-side control signal of the display control circuit 11A to output a signal for selecting/scanning a scan line; and a liquid crystal display panel 15A that comprises a matrix-shape signal line and scan line and has a source/gate electrode of a TFT transistor connected to an intersection, and a drain electrode connected to a pixel electrode respectively.

In such a liquid crystal display device, the video data to be input/output into/from the display control circuit 11A in the interior of the device is transferred as parallel data via a data bus that is composed of a plurality of the signal lines; however due to upsizing of the liquid crystal display panel, an increase in the pixel number thereof, the high definition of the display image, etc. the bit number of the video data is increased, the inversion number of the bit (bit inversion number) is also increased between the previously positioned data and the subsequently positioned data in a continuous sequence of the output video data (referred to as “previous data”, and “subsequent data” respectively), and when the bit inversion number is large, radiation of a harmonic component caused by switching the data and from the bus augments, thus causing electromagnetic interference (EMI) to occur.

Thereupon, it was proposed as a method of restraining such electromagnetic radiation that the bit inversion number of the subsequent data relative to the previous data of the video data was compared in the data order, the subsequent data of which the bit inversion number became more than half of the bit number of the data was converted into the video data controlled so that the bit inversion number between two pieces of the data was constantly equal to or less than half, by performing such a data process to invert its logical level, and that simultaneously therewith, an inversion signal (POL2) indicating whether or not the logical level was inverted was added as one of the foregoing signal-side control signals to transfer both signals within the liquid crystal display device (JP-P2001-356737A).

FIG. 9 is a conceptual view illustrating a control of the bit inversion number in the data transfer between the display control circuit and the signal-line driving circuit. Also, FIG. 10 is a conceptual view illustrating an example of the data transfer. The display control circuit 11A is provided with a bit comparator 112, an inversion/noninversion circuit (1) 114, etc. In the display control circuit 11A, the input video data is input, data (previous data) 111 sent just before is compared with data (subsequent data) 113 that is to be sent from now on in the bit comparator 112, an inversion or a noninversion of the subsequent data is made in the inversion/noninversion circuit (1) 114 by whether or not the comparison result is more than half of the bit number of the above video data to output it to the data bus, and, simultaneously therewith, an inversion signal (POL2) of one signal line of the signal-side control signals is taken as the active (its logic state is an “H” level), etc.

Also, the signal-line driving circuit 14A is provided with an inversion/noninversion circuit (2) 141, and a data register 142 in which data is filed. The inversion/noninversion circuit (2) 141 takes a control of receiving the video data and the inversion signal to be input via the data bus, of inverting the video data, which was input, to output it to the data register 142 in the event that the inversion signal is at an “H” level, and of outputting the video signal, which was input, as it stands to a data register 142 in the event that the inversion signal is not at the “H” level (“L” level), based on the inversion signal data by data, and reproduces the original data to latch it to the data register 142 in preparation for conversion thereof into the gradation voltage that is to be made afterward.

FIG. 11 is a view illustrating an example of the video data obtained by taking a control of the bit inversion for the 24-bit input video data of red (R), green (G), and blue (B). 24-bit parallel data R7 (0) . . . R0 (0), G7 (0) . . . G0 (0), and B7 (0) . . . B0 (0) shown firstly is a signal of the noninversion, of which the inversion signal is at the “L” level, 24-bit parallel data R7 (1)^ . . . R0 (1)^, G7 (1)^ . . . G0 (1)^, and B7 (1)^ . . . B0 (1)^ shown secondly is a signal of the inversion (^ indicates the inversion), of which inversion signal is at the “H” level, and those that follow are the same.

Also, as a method of dealing with an increase in the bit number of the video data to curtail the data bus number, the method has been considered of serializing one part of the parallel data to curtail the bit number. Furthermore, executing a control of the bit inversion number for such video data as well can be considered.

FIG. 12 is a view illustrating a timing chart of a data form of the data bus and the inversion signal, as one example, in the event of making a serial transfer at a ratio of 2 to 1. As to the input video data of 24-bit parallel data, it has the data form of a 12-bit parallel serialized partially (2 bits) in a form that its even bit is piled on the odd bit in multiple in a time-division manner. Herein, a clock CH is a clock signal of the input video data prior to partial serialization, and a clock HCK is a clock signal of the 12-bit parallel data after partial serialization. As seen from the same figure, a data rate (data speed) of the 12-bit parallel data is two times as quick as that of the 24-bit parallel data.

As mentioned before, in the liquid crystal display device, the data bus number and the data transfer speed have been increased with an increase in the pixel number and the gradation number due to the upsizing of the display screen, the high definition of the display image, etc., whereby it is of importance to restrain the electromagnetic interference, and to curtail the data bus number. Herein, it is effective to take an inversion control of the logical level of the data in order to restrain the electromagnetic interference, and also, it is effective to partially serialize the parallel data in order to curtail the data bus number.

As it is, when the parallel data is serialized partially, as a result, the data speed of the partially serialized video data is increased by the multiple of the bit number by which the parallel data is serialized, the operational speed for the inversion control of the logical level of the data also becomes high by the same multiple, and in making a conventional inversion control of the logical level, its circuit operation is speeded up (for example, the high-speed operation is required for the bit comparator, the inversion/noninversion circuit, etc. shown in FIG. 9 to the extent that the parallel data was serialized), whereby the problem exists that a correspondence to the increase in the pixel number and the gradation number also becomes difficult. Also, the electromagnetic interference etc. caused by the switching for the inversion control of the logical level is also derived as a new problem.

SUMMARY OF THE INVENTION

An objective of the present invention is to provide a video data transfer method, a display control circuit, and a liquid crystal display device that enable effective restrain of the electromagnetic interference even in the high-definition display etc. of the video data.

Further more, an objective of the present invention is to provide a video data transfer method, a display control circuit, and a liquid crystal display device adapted so that the operational speed of the data inversion process for restraining the electromagnetic interference does not become high, even though the number of the data bus for transferring the video data is reduced by partially serializing the data.

The video data transfer method of the present invention, which is a video data transfer method of transferring input video data that is composed of parallel data as partially serialized output video data to a signal-line driving circuit, is characterized in that, in the event that the bit inversion number between data positioned previously and data positioned subsequently in a continuous sequence of said output video data is more than half of the bit number of said output video data, an inversion process for inverting a logic state of succeeding said output video data is performed at a stage of said input video data that is composed of said parallel data.

The video data transfer method of the present invention, which is a video data transfer method of serializing input video data of a $3\times2^n$-bit (for example, n=3, 3×8=24) parallel in a $2^m$-bit (for example, m=1, $2^1$=2) (n and m: natural numbers, n>m) unit to transfer it as output video data of a $3\times2^{(n-m)}$-bit (for example, $3\times2^2$=12) parallel to a signal-line driving circuit, is characterized in that an inversion or a noninversion of a polarity of the succeeding bit is made for each of $3\times2^{(n-m)}$ (for example, 12) bits of said input video data that corresponds to $3\times2^{(n-m)}$-bit (for example, 12) parallel data of said output video data so that the bit inversion number between the previous data and the subsequent data of a $3\times2^{(n-m)}$-bit (for example, 12) parallel of said output video data is $3\times2^{(n-m-1)}$ (for example, 6) or less.

The display control circuit of the present invention, which is a display control circuit for inputting input video data (for example, (a) of FIG. 1) that is composed of parallel data to transfer video data obtained by serializing each piece of the input video data in a two-bit unit (for example, R7 (0) and R6 (0) of FIG. 1) of a first bit (for example, an odd bit) and a second bit (for example, an even bit) as output video data (for example, (b) of FIG. 1) to a signal-line driving circuit, is characterized in having:

first comparison determination means (for example, C1, J1, etc. of FIG. 2) for comparing the noninversion bit of the second bit (for example, R6 (0) of FIG. 1) of the previous data (for example, data 1 of FIG. 1) with the noninversion bit of the first bit (for example, R7 (1) of FIG. 1) of the subsequent data (for example, data 2 of FIG. 1) to output a determination result as to whether or not the bit inversion number is more than half;

second comparison determination means (for example, I1, C2, J2, etc. of FIG. 2) for comparing the inversion bit of the second bit (for example, R6 (0) of FIG. 1) of the previous data (for example, data 1 of FIG. 1) with the noninversion bit of the first bit (for example, R7 (1) of FIG. 1) of the subsequent data (for example, data 2 of FIG. 1) to output a determination result as to whether or not the bit inversion number is more than half;

third comparison determination means (for example, C3, J3, etc. of FIG. 2) for comparing the noninversion bit of the first bit (for example, R7 (1) of FIG. 1) of the subsequent data (for example, data 2 of FIG. 1) with the noninversion bit of the second bit (for example, R6 (1) of FIG. 1) of the subsequent data (for example, data 2 of FIG. 1) to output a determination result as to whether or not the bit inversion number is more than half;

fourth comparison determination means (for example, I2, C4, J4, etc. of FIG. 2) for comparing the inversion bit of the first bit (for example, R7 (1) of FIG. 1) of the subsequent data (for example, data 2 of FIG. 1) with the noninversion bit of the second bit (for example, R6 (1) of FIG. 1) of the subsequent data (for example, data 2 of FIG. 1) to output a determination result as to whether or not the bit inversion number is more than half;

selection means (for example, S1, S2, D3, etc. of FIG. 2) that is composed of first selection means and second selection means for selecting/outputting the output of either of the determination results of said first comparison determination means and said second comparison determination means, and the output of either of the determination results of said third comparison determination means and said fourth comparison determination means respectively, said first selection means being controlled by the output of second selection means based on the input video data that is one piece of the data ahead, said second selection means being controlled by the output of the first selection means;

output means (for example, P1, P2, D6, D7, D8, D9, etc. of FIG. 2) for, based on the output of said first selection means and the output of said second selection means of said selection means, making an inversion or a noninversion of the first bit of the subsequent data and the second bit of the subsequent data respectively to output them, and for outputting an inversion signal indicating said inversion or noninversion; and a parallel-to-serial conversion circuit (for example, T1, T2, etc. of FIG. 2) for serializing the output of said output means in a two-bit unit to output it as the output video data and an output inversion signal.

The display control circuit of the present invention, which is a display control circuit for inputting input video data of a $3\times2^n$-bit parallel to transfer it as the output video data serialized in a $2^m$-bit (n and m: natural numbers, n>m) unit of a first bit, a second bit, . . . , and a $2^m$-th bit to a signal-line driving circuit, is characterized in having: first comparison determination means for comparing the noninversion bit of the $2^m$-th bit of the previous data having a $2^m$-bit unit with the noninversion bit of the first bit of the subsequent data having a $2^m$-bit unit to determine whether or not the bit inversion number is more than half; second comparison determination means for comparing the inversion bit of the $2^m$-th bit of the previous data having a $2^m$-bit unit with the noninversion bit of the first bit of the subsequent data having a $2^m$-bit unit to determine whether or not the bit inversion number is more than half; third comparison determination means for comparing the noninversion bit of the first bit of the subsequent data having a $2^m$-bit unit with the noninversion bit of the second bit of the subsequent data having a $2^m$-bit unit to determine whether or not the bit inversion number is more than half; fourth comparison determination means for comparing the inversion bit of the first bit of the subsequent data having a $2^m$-bit unit with the noninversion bit of the second bit of the subsequent data having a $2^m$-bit unit to determine whether or not the bit inversion number is more than half; . . . ; $2\times2^m-1$-th comparison determination means for comparing the noninversion bit of the $2^m-1$-th bit of the subsequent data having a $2^m$-bit unit with the noninversion bit of the $2^m$-th bit of the subsequent data having a $2^m$-bit unit to determine whether or not the bit inversion number is more than half; $2\times2^m$-th comparison determination means for comparing the inversion bit of the $2^m-1$-th bit of the subsequent data having a $2^m$-bit unit with the noninversion bit of the $2^m$-th bit of the subsequent data having a $2^m$-bit unit to determine whether or not the bit inversion number is more than half;

selection means that is composed of first selection means, second selection means, . . . , and $2^m$-th selection means for selecting/outputting the output of either of the determination results of said first comparison determination means and said second comparison determination means, the output of either of the determination results of said third comparison determination means and said fourth comparison determination means, . . . , and the output of either of the determination results of said $2\times2^m-1$-th comparison determination means and said $2\times2^m$-th comparison determination means respectively, said first selection means being controlled by the output of the $2^m$-th selection means based on the input video data that is one piece of the data ahead, said second selection means being controlled by the output of the first selection means, . . . , said the $2^m$-th selection means being controlled by the output of the $2^m-1$-th selection means;

output means for, based on the outputs of said first selection means, said second selection means, . . . , and said $2^m$-th selection means of said selection means, making an inversion or a noninversion of the first bit, the second bit, . . . , and the $2^m$-th bit of said subsequent data respectively to output them, and for outputting an inversion signal indicating said inversion or noninversion; and a parallel-to-serial conversion circuit for serializing the output of said output means in a $2^m$-bit unit to output it as the output video data and an output inversion signal.

The liquid crystal display device of the present invention, which is a liquid crystal display device comprising: a display control circuit for inputting input video data that is composed of parallel data to transfer the video data obtained by serializing each piece of the input data in a two-bit unit of a first bit and a second bit as output video data; and a signal-line driving circuit for inputting said output video data, is characterized in that said display control circuit has:

first comparison determination means (for example, C1, J1, etc. of FIG. 2) for comparing the noninversion bit of the second bit (for example, R6 (0) of FIG. 1) of the previous data (for example, data 1 of FIG. 1) with the noninversion bit of the first bit (for example, R7 (1) of FIG. 1) of the subsequent data (for example, data 2 of FIG. 1) to output a determination result as to whether or not the bit inversion number is more than half;

second comparison determination means (for example, I1, C2, J2, etc. of FIG. 2) for comparing the inversion bit of the second bit (for example, R6 (0) of FIG. 1) of the previous data (for example, data 1 of FIG. 1) with the noninversion bit of the first bit (for example, R7 (1) of FIG. 1) of the subsequent data (for example, data 2 of FIG. 1) to output a determination result as to whether or not the bit inversion number is more than half;

third comparison determination means (for example, C3, J3, etc. of FIG. 2) for comparing the noninversion bit of the first bit (for example, R7 (1) of FIG. 1) of the subsequent data (for example, data 2 of FIG. 1) with the noninversion bit of the second bit (for example, R6 (1) of FIG. 1) of the subsequent data (for example, data 2 of FIG. 1) to output a determination result as to whether or not the bit inversion number is more than half;

fourth comparison determination means (for example, I2, C4, J4, etc. of FIG. 2) for comparing the inversion bit of the first bit (for example, R7 (1) of FIG. 1) of the subsequent data (for example, data 2 of FIG. 1) with the noninversion bit of the second bit (for example, R6 (1) of FIG. 1) of the subsequent data (for example, data 2 of FIG. 1) to output a determination result as to whether or not the bit inversion number is more than half;

selection means (for example, S1, S2, D3, etc. of FIG. 2) that is composed of first selection means and second selection means for selecting/outputting the output of either of the determination results of said first comparison determination means and said second comparison determination means, and the output of either of the determination results of said third comparison determination means and said fourth comparison determination means respectively, said first selection means being controlled by the output of second selection means based on the input video data that is one piece of the data ahead, said second selection means being controlled by the output of the first selection means;

output means (for example, P1, P2, D6, D7, D8, D9, etc. of FIG. 2) for, based on the output of said first selection means and the output of said second selection means of said selection means, making an inversion or a noninversion of the first bit of the subsequent data and the second bit of the subsequent data respectively to output them, and for outputting an inversion signal indicating said inversion or noninversion; and a parallel-to-serial conversion circuit (for example, T1, T2, etc. of FIG. 2) for serializing the output of said output means in a two-bit unit to output it as the output video data and an output inversion signal.

The liquid crystal display device of the present invention, which is a liquid crystal display device comprising: a display control circuit for inputting input video data of a $3\times2^n$-bit parallel to transfer the video data serialized in a $2^m$-bit (n and m: natural numbers, n>m) unit of a first bit, a second bit, . . . , and a $2^m$-th bit as output video data; and a signal-line driving circuit for inputting said output video data, is characterized in that said display control circuit has:

first comparison determination means for comparing the noninversion bit of the $2^m$-th bit of the previous data having a $2^m$-bit unit with the noninversion bit of the first bit of the subsequent data having a $2^m$-bit unit to determine whether or not the bit inversion number is more than half; second comparison determination means for comparing the inversion bit of the $2^m$-th bit of the previous data having a $2^m$-bit unit with the noninversion bit of the first bit of the subsequent data having a $2^m$-bit unit to determine whether or not the bit inversion number is more than half; third comparison determination means for comparing the noninversion bit of the first bit of the subsequent data having a $2^m$-bit unit with the noninversion bit of the second bit of the subsequent data having a $2^m$-bit unit to determine whether or not the bit inversion number is more than half; fourth comparison determination means for comparing the inversion bit of the first bit of the subsequent data having a $2^m$-bit unit with the noninversion bit of the second bit of the subsequent data having a $2^m$-bit unit to determine whether or not the bit inversion number is more than half; . . . ; $2\times2^m-1$-th comparison determination means for comparing the noninversion bit of the $2^m-1$-th bit of the subsequent data having a $2^m$-bit unit with the noninversion bit of the $2^m$-th bit of the subsequent data having a $2^m$-bit unit to determine whether or not the bit inversion number is more than half; $2\times2^m$-th comparison determination means for comparing the inversion bit of the $2^m$-1-th bit of the subsequent data having a $2^m$-bit unit with the noninversion bit of the $2^m$-th bit of the subsequent data having a $2^m$-bit unit to determine whether or not the bit inversion number is more than half;

selection means that is composed of first selection means, second selection means, . . . , and $2^m$-th selection means for selecting/outputting the output of either of the determination results of said first comparison determination means and said second comparison determination means, the output of either of the determination results of said third comparison determination means and said fourth comparison determination means, . . . , and the output of either of the determination results of said $2\times2^m-1$-th comparison determination means and said $2\times2^m$-th comparison determination means respectively, said first selection means being controlled by the output of the $2^m$-th selection means based on the input video data that is one piece of the data ahead, said second selection means being controlled by the output of the first selection means, . . . , said the $2^m$-th selection means being controlled by the output of the $2^m-1$-th selection means;

output means for, based on the outputs of said first selection means, said second selection means, . . . , and said $2^m$-th selection means of said selection means, making an inversion or a noninversion of the first bit, the second bit, . . . , and the $2^m$-th bit of said subsequent data respectively to output them, and for outputting an inversion signal indicating said inversion or noninversion; and a parallel-to-serial conversion circuit for serializing the output of said output means in a $2^m$-bit unit to output it as the output video data and an output inversion signal.

In the method of partially serializing the video data to transfer it to the signal-line diving circuit such as the source driver from the display control circuit, in a stage of the parallel data prior to making a parallel-to-serial conversion of the video data, a comparison is sequentially made of the data that corresponds to the data after serialization to take a control of the inversion/noninversion for the parallel data by whether or not the bit inversion number is more than half. As compared with the case in which a control is taken of the inversion/noninversion for the data after partial serialization of the video data, of which the operational speed became high, the operation speed of the comparator, inversion/noninversion determination circuit, etc. can be reduced.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, one embodiment of the video data transfer method, the display control circuit, and the liquid crystal display device of the present invention will be explained by referring to the accompanied drawings.

Figure 1:
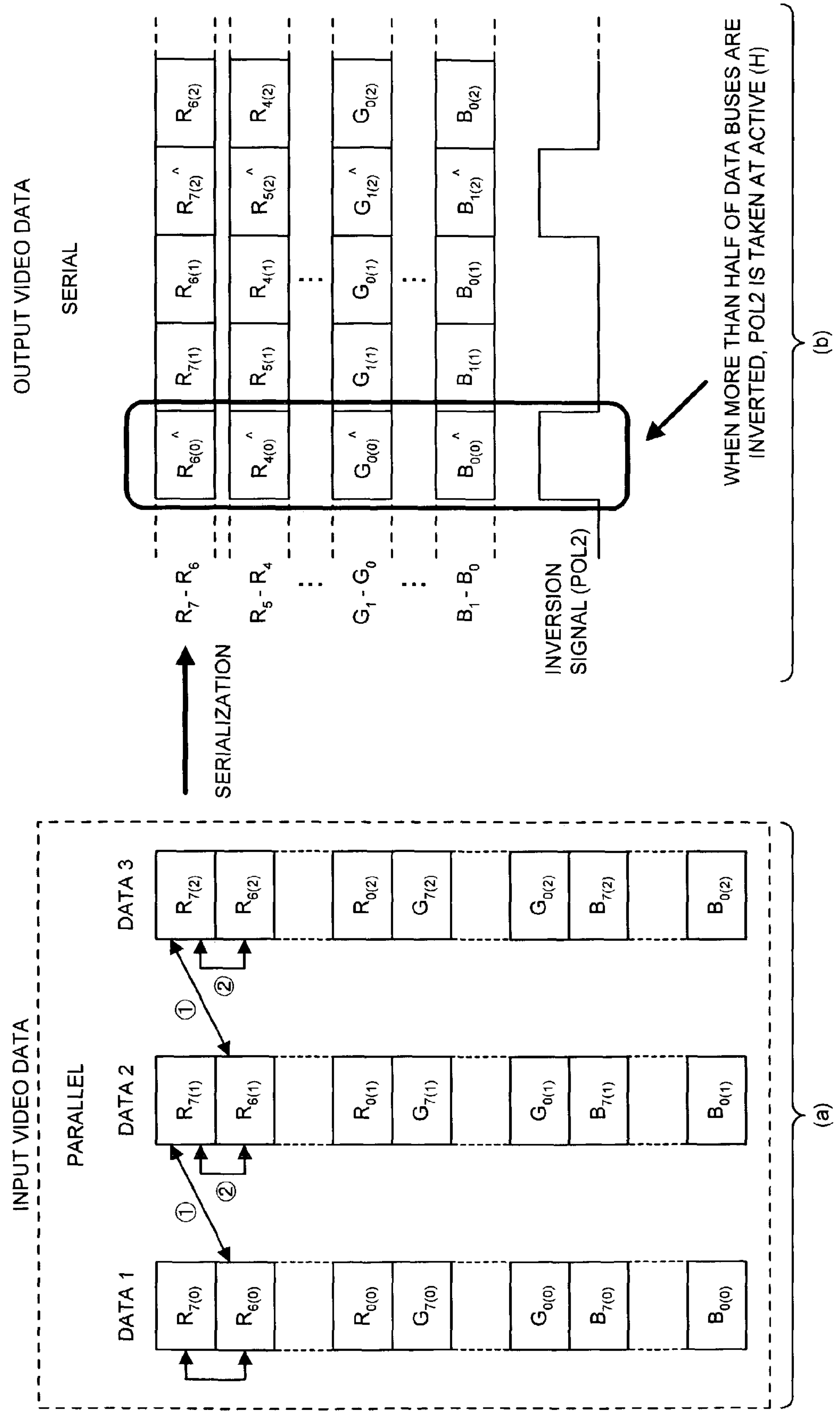
FIG. 1 is a view illustrating the signal form of the video data to be input and output in the first embodiment of the present invention.

FIG. 1 is a view illustrating a signal form of the video data to be input and output in a first embodiment of the present invention. In this embodiment, as an object of input video data (DATA) is taken the data having 3 of the parallel eight bits that correspond to each of brightness signals of red (R), green (G), and blue (B), i.e. gradation display data of 24-bit parallel, and as an object of the output video data is taken the partially serialized 12-bit data of which the data bus number is ½. Specifically, the input video data is 24-bit parallel data of R0 to R7, G0 to G7, and B0 to B7 shown in FIG. 1(*a*), and the output video data is 12-series data (for example, R7-R6, R5-R4, . . . , G1-G0, and B1-B0, hereinafter, also referred to as serial data) obtained by serializing (for example, R7 (1) and R6 (1), and R7 (2) and R6 (2)) odd bits (for example, R7 (1) and R7 (2)) and even bits (for example, R6 (1) and R6 (2)) of the 24-bit parallel data shown in FIG. 1(*b*) in a two-bit (neighboring two-bit) unit.

In this embodiment, by performing an inversion/noninversion process of the 24-bit parallel data (data 1, data 2, and data 3) of the input video data in a neighboring two-bit unit (for example, R7 (0) and R6 (0), R7 (1) and R6 (1), R7 (2) and R6 (2), . . . ) in a stage of the parallel data as shown in FIG. 1(*a*), the inversion number of the data (bit inversion number) between the parallel bits among 12 systems of the time-series data is controlled to be equal to or less than half of the total bit number (12 bits). An outline of the process of this embodiment will be explained by use of FIG. 1.

As a glance at one system of data R7 to R6 (R6 (0), R7 (1), R6 (1), R7 (2), R6 (2), . . . ) after serial conversion of this embodiment shown in FIG. 1(*b*) demonstrates, it is that obtained by serializing neighboring two bits of each piece of parallel data 1, 2, 3, . . . on the highest-ranked side shown in FIG. 1(*a*). Similarly, the other pieces of data R5-R4, . . . , G1-G0, . . . , B1-B0 are also that obtained by serializing respective neighboring two bits sequentially located from the highest ranked side to the lower ranked side of FIG. 1(*a*).

In this embodiment, with regard to the neighboring two bits (R7 (0) and R6 (0), R7 (1) and R6 (1), R7 (2) and R6 (2), . . . ) on the highest ranked side of FIG. 1(*a*), ① a comparison is made between the even bit (R6 (0)) of the neighboring two bits (R7 (0) and R6 (0)) of the previously positioned data in the continuous sequence of the input video data (refereed to as "previous data") (data 1) and the odd bit (R7 (1)) of the neighboring two bits (R7 (1) and R6 (1)) of the subsequently positioned data, which are at the same digit (same position), in the continuous sequence of the input video data (refereed to as "subsequent data") (data 2) to detect whether or not a change exists in the data, and continuously, ② a comparison is made between the odd bit (R7 (1)) and the even bit (R6 (1)) that are fellow neighboring two bits (R7 (1) and R6 (1)) of the subsequent data (data 2) at the identical position to detect whether or not a change exists in the data. Also, with regard to respective neighboring two bits as well sequentially located from the highest ranked side to the lower ranked side, the similar comparison operations ① and ② are simultaneously performed between the previous data and the subsequent data to determine whether or not the bit inversion number is more than half, based on its all comparison results, and to take a control of the inversion/noninversion for the previous data and the subsequent data.

Herein, in the comparison operations ① and ② of all of the neighboring two bits, it is not clear whether or not the previous data, which became a reference for comparison, was inverted to output it as the output video data, whereby as to the even bit and the odd bit in each comparison operation, the data of the noninversion and the data of the inversion thereof are pre-prepared to make a comparison between each of them and the subsequent data, and to select either of them based on the previous comparison operations ② and ①. In short, the result of the comparison operation ② is utilized in the comparison operation ①, and the result of the comparison operation ① is utilized in the comparison operation ②.

And, based on the result of the comparison operation ① or ② mentioned above, a control of the inversion/noninversion for the input video data is taken to output it as the parallel data, and also, information as to whether or not it was inverted in a data unit is output in parallel as an inversion signal (POL2), each of which is converted into the serial data and is output.

(Explanation of the Configuration)

Figure 2:
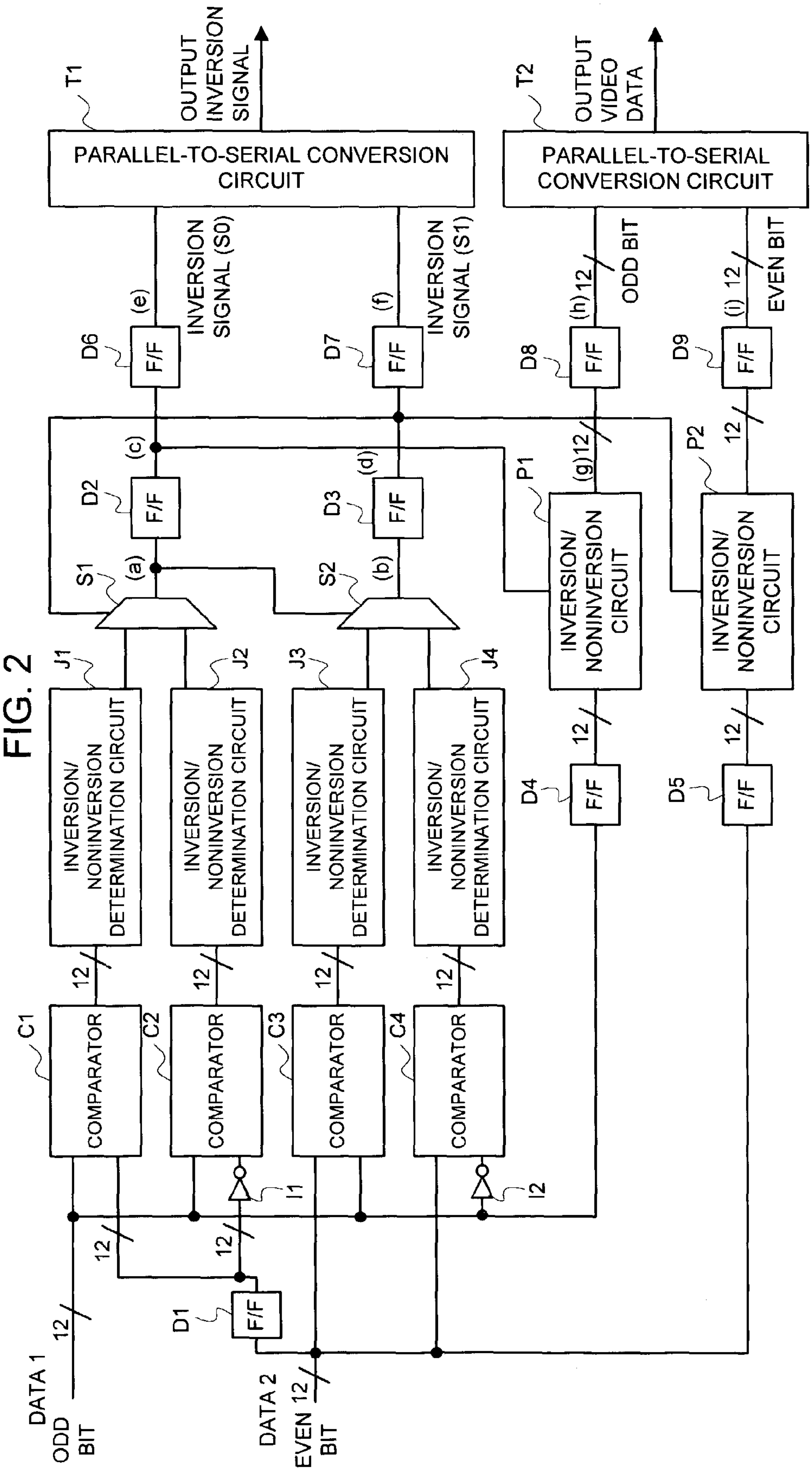
FIG. 2 is a view illustrating the configuration of the display control circuit of this embodiment by the two-bit comparison.

FIG. 2 is a view illustrating a configuration of the liquid crystal display device of this embodiment by a two-bit comparison.

The circuit configuration of this embodiment, which has 12 input terminals (DATA 1) for inputting the odd bit having a neighboring two-bit unit out of 24-bit parallel data of the input video data, and 12 input terminals (DATA 2) for similarly inputting the even bit, comprises: 12 delay circuits D1 for delaying the input of the even bit by one clock (one HCK portion); 12 comparators C1 and C2 each for comparing the odd bit as against the output of each delay circuit D1 and the signal obtained by inverting its output by an inversion circuit I1; 12 comparators C3 and C4 each for comparing the even bit as against the odd bit and the signal obtained by inverting its odd bit by an inversion circuit I2; and inversion/noninversion determination circuits J1 and J2, and J3 and J4 for inputting the output of each of the comparators C1 and C2, and C3 and C4 respectively to determine the inversion/noninversion thereof, comprises: selectors S1 and S2 for selecting and outputting the outputs of the inversion/noninversion determination circuits J1 and J2, and J3 and J4, said selector S2 being controlled by the output of the selector S1, said selector Si being controlled by the output of a delay circuit D3 for delaying the output of the selector S2 by one clock; and a delay circuit D2 for delaying the output of the selector Si by one clock, and furthermore comprises: delay circuits D4 and D5 for delaying the odd bit and the even bit of the input video data by one clock respectively; 12 inversion/noninversion circuits P1 and P2 each for taking a control of the inversion/noninversion for the outputs of the delay circuits D4 and D5 respectively; delay circuits D8 and D9 for delaying the output of each of the inversion/noninversion circuits P1 and P2 by one clock to output it as the odd bit and the even bit respectively; delay circuits D6 and D7 for delaying the outputs of the delay circuit D2 and the delay circuit D3 by one clock respectively, which output an inversion signal POL2 (S0) and an inversion signal POL2 (S1) relative to the odd bit and the even bit from the delay circuits D8 and D9 respectively; and parallel-to-serial conversion circuits T1 and T2 for making a parallel-to-serial conversion of respective signals and bits.

Herein, each of the delay circuits D1 to D9, which is configured of, for example, a D-type flip-flop circuit (F/F) with a clock CLK terminal and a reset terminal, is possible to reset, for example, in an initial state, and delaying the data is realized by latching the data with the clock to be synchronized with the data.

A function of each section of this embodiment is as follows.

The delay circuit D1 has a function of eliminating a time difference of one clock (one HCK portion) in order to compare the even bit with the odd bit. Inversion circuits I1 and I2 invert the previous data (data that is one clock ahead) that becomes a reference for making a comparison of the time-series data, thereby enabling the comparison in the event that the previous data was inverted. The comparators C1 to C4 have a function of comparing two pieces of the input data to output the logic "L" (low level) in the event that the logic states thereof accord, and the logic "H" (high level) in the event that the logic states thereof do not accord.

In particular, the comparators C1 and C2 are a comparator for, with the even bit of the neighboring two bits of a certain piece of the parallel data taken as a reference, comparing the odd bit of the neighboring two bits of the next piece of the parallel data located at the identical position, the comparator C1 is one for making a comparison between said even bit and said odd bit, and the comparator C2 is one for making a comparison between that obtained by inverting said even bit and said odd bit. Also, the comparators C3 and C4 are a comparator for, with the odd bit of the neighboring two bits of said next piece of the parallel data located at the identical position taken as a reference, comparing the even bit of the above neighboring two bits, the comparator C3 is one for making a comparison between said odd bit and said even bit, and the comparator C4 is one for making a comparison between that obtained by inverting said odd bit and said even bit. Additionally, as described before, the neighboring two bits of said certain piece of said parallel data and the neighboring two bits of said next piece of said parallel data are equivalent to time-series continuous 4 bits of two-bit serial data (partially serialized video data), and the comparator has a function of sequentially comparing the corresponding 4 bits of the previous parallel data in a two-bit unit that, as a result, becomes two-bit serial data.

The inversion/noninversion determination circuits J1 to J4 input each output of the comparators C1 to C4, determine whether or not the "L" state number of the output of each of 12 set of the comparators is more than half, output the "L" state in the event that the "L" state number is more than half (the "H" state number is equal to or less than half), and output the "H" state in the event that the "L" state number is equal to or less than half (the "H" state number is more than half).

The selector S1, which is controlled by an output (d) of the delay circuit D3, has a function of, when the output (d) is "L", of selecting and outputting the output of the inversion/noninversion determination circuit J1, and when the output (d) is "H", of selecting and outputting the output of the inversion/noninversion determination circuit J2. The selector S2, which is controlled by an output (a) of the selector S1, has a function of, when the output (a) is "L", selecting and outputting the output of the inversion/noninversion determination circuit J3, and when the output (a) is "H", of selecting and outputting the output of the inversion/noninversion determination circuit J4.

The delay circuits D4 and D5 have a function of delaying the odd bit and the even bit by one clock to eliminate discrepancy in an operational timing with the determination outputs (c) and (d) from the delay circuit D2 and D3. The inversion/noninversion circuits P1 and P2 comprising 12 sets have a function of confirming the existence of the inversion of the sequential odd bit and even bit of the neighboring two bits based on the determination outputs (c) and (d) of the determination circuits.

One set of the delay circuits D6 and D7 has a function of delaying the inversion signal from the determination circuit by one clock to output it in parallel, and 12 sets of the delay circuits D8 and D9 have a function of delaying the parallel data from 12 sets of the inversion/noninversion circuits P1 and P2 by one clock to output it in parallel.

The parallel-to-serial conversion circuit T1 has a function of converting the parallel output of the delay circuits D6 and D7 into a serial signal to output it as an inversion signal. The parallel-to-serial conversion circuit T2 has a function of converting 24 parallel outputs of the odd bit and the even bit from 12 sets of the delay circuits D8 and D9 into partially serialized 12 systems of the serial data to output them as the output video data correspondingly to said inversion signal.

(Explanation of the Operation)

Next, an operation of the first embodiment shown in FIG. 2 will be explained in detail below by referring to a data array of FIG. 1.

The comparators C1, C2, C3 and C4 of this embodiment are operationally a comparator for performing a comparison process of the neighboring two bits of the parallel data on the highest-ranked side; however for convenience' sake, the explanation will be made on the premise that a comparator for appropriately performing a comparison process of the remaining neighboring two bits was included therein. Also, 12 inversion/noninversion circuits etc. are also similar. Also, in the operation of this embodiment, it is assumed that R6 (0) of the data 1 of the input video data was treated as the noninversion in the inversion/noninversion process, and that, as to the flip-flop circuit (F/F) that configures each of the delay circuits D1 to D9, the output thereof was reset at "L" as an initial condition. Hereinafter, the operation at the time of inputting the data 2 and afterward will be explained.

The output of the delay circuit D3 is "L" in the initial condition, whereby the selector S1 selects the output of the determination result of the inversion/noninversion determination circuit J1 to which was connected the comparator C1 into which the even bit (R6 (0) etc.) of the data 1 that becomes a reference for comparison is input without being inverted. The inversion/noninversion determination circuit J1 determines whether or not the bit inversion number is more than half based on the comparison result of R6 (0) and R7 (0) and the remaining neighboring two bits to output a determination result as to whether or not the odd bit (R7 (1) etc.) is inverted.

i) Herein, in the event that the inversion/noninversion determination circuit J1 provisionally determined that the bit inversion number was equal to or less than half, then the output (a) of J1 becomes "L", whereby at the input time of the identical data 2, the selector S2 selects the output of the inversion/noninversion determination circuit J3 connected to 12 comparators C3 into which the odd bit (R7 (0) etc.) of the data 2, which becomes a reference for comparison, is input without being inverted. The inversion/noninversion determination circuit J3 inputs the comparison result of R7 (1) and R6 (1) and the remaining neighboring two bits, determines whether or not the bit inversion number is more than half, and outputs a determination result as to whether or not the even bit (R6 (1) etc.) of the data 2 is inverted.

ii) Also, to the contrary, in the event that the inversion/noninversion determination circuit J1 determined that the bit inversion number was more than half, the output (a) of J1 becomes "H", whereby the selector S2 selects the output of the inversion/noninversion determination circuit J4 connected to 12 comparators C4 in which the odd bit (R7 (1) etc.) of the data 2 that became a reference for comparison was inverted. The inversion/noninversion determination circuit J4 inputs the comparison result of R7 (1)^ (^ indicates the inversion) and R6 (1), and the remaining neighboring two bits to output a determination result as to whether or not the bit inversion number is more than half.

In any case, the output (a) of the selector S1 becomes the output (c) delayed one clock by the delay circuit D2, and the output (b) of the selector S2 becomes the output (d) delayed one clock by the delay circuit D3, which become a control signal for the inversion/noninversion by the inversion/noninversion circuits P1 and P2 at the input time of the next data 3 respectively, and are output as an inversion signal to the parallel-to-serial conversion circuit T1 via the delay circuits D6 and D7.

The inversion/noninversion circuits P1 and P2 have already input the data 2 having the odd bit and the even bit of said neighboring two bits delayed one clock via the delay circuits D4 and D5 respectively, whereby each piece of the data 2, of which the logic state is controlled by the outputs (c) and (d) that are the control signal of the inversion/noninversion, is output.

In short, in the event that the inversion/noninversion determination circuit J1 determined that the bit inversion number was equal to or less than half, the output (c) (the output (a)) is "L", and the inversion/noninversion circuit P1 outputs the logic state of the odd bit from the delay circuit D4 as the noninversion (R7 (1)), and in the event that the inversion/noninversion determination circuit J1 determined that the bit inversion number was more than half, the output (c) (the output (a)) is "H", and the inversion/noninversion circuit P1 outputs the logic state of the odd bit from the delay circuit D4 as the inversion (R7 (1)^), which is output to the parallel-to-serial conversion circuit T2 as an output (h) via the delay circuit D8. Also, by taking the output (d) (the output (b)) of the selector S2 to be decided by the output state of the inversion/noninversion determination circuits J3 and J4 to be selected by the output state of the selector S1 as the control signal, the inversion/noninversion circuit P2 makes an inversion or a noninversion of the logic state of the even bit from the delay circuit D5 to output it, and the above output is output as an output (i) to the parallel-to-serial conversion circuit T2 via the delay circuit D9.

The parallel-to-serial conversion circuit T2 converts the neighboring two bits of which the logic state was controlled into the serial data to output it, and the parallel-to-serial conversion circuit T1 converts inversion signals (e) and (f) into the serial data to output it as the inversion signal POL2 indicating a control result of the polarity of the serial signal of said neighboring two bits, which is synchronized with said serial data.

A control of the inversion/noninversion for the logic state of the data having a unit of three bits of the even bit of the previous data 1 (see FIG. 1), the odd bit of the subsequent data 2 (see FIG. 1), and the even bit of the subsequent data 2 in the input video data as mentioned above, and a signal process of converting the parallel data into the serial data are carried out similarly in the succeeding data 3 and afterward. For example, it is assumed that the output (b), which is a finish result of the process of the neighboring two bits (R7 (1) and R6 (1)) of the data 2, is "H", in the process with the next three bits taken as a unit, the selector S1 selects the determination result of the inversion/noninversion determination circuit J2, the selector S2 outputs the determination result of the inversion/noninversion determination circuit J3 or J4 based on "L" or "H" of its output (a), and a control is taken of the inversion/noninversion for the neighboring two bits of the corresponding data 3 in the inversion/noninversion circuits P1 and P2 after one clock's delay, based on these outputs.

Figure 3:
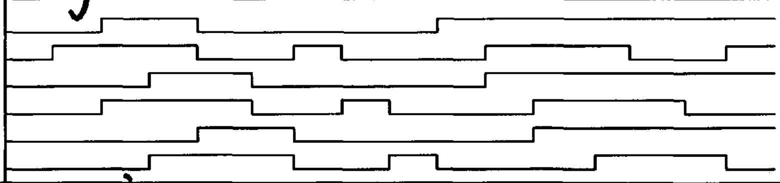
FIG. 3 is a view illustrating the timing chart of the operation of the first embodiment.

FIG. 3 is a view illustrating a timing chart of the operation of this embodiment. The same figure is a timing chart in which the parallel data as the input video data that is composed of 24 bits is divided into the odd bit and the even bit each having 12 bits for illustration, the outputs (a) to (f) of the inversion signal are illustrated, and as to the parallel data after the process of the inversion/noninversion, the odd bit having 12 bits to be output from the inversion/noninversion circuit P1 is illustrated. Hereinafter, the operation of this embodiment will be explained in the order of the input time t1, t2, t3, . . . of the input video data with an example shown in FIG. 3.

In the same figure, the pieces of the parallel data up to the time of t1 are all taken as 0, and the flip-flops configuring the delay circuits, into which the parallel data shown in the same figure is input at the time of t2 and afterward, are all taken at zero (reset) state in the initial state. In this case, the outputs (a) to (f) are all "L" at the time of t1.

At the time of t2: the output (d) of the delay circuit D3 is "L" in the input state of the data at the time of t2 encircled by a broken line, whereby the selector S1 selects the output of the inversion/noninversion determination circuit J1 for determining the bit inversion number of the comparison result between the odd bit (101000100100) and the even bit (000000000000) sent just before (t1). The bit inversion number at this time is 4, whereby the output (a) becomes "L". For this, the selector S2 selects the output of the inversion/noninversion determination circuit J3 for determining the bit inversion number of the comparison result between the odd bit (101000100100) and the even bit (110100111010). The bit inversion number at this time is 6, whereby the output (b) becomes "H".

Simultaneously, the output (c) of the delay circuit D2 is "L" at the time of t2, whereby the inversion/noninversion circuit P1 outputs an output odd bit (g) (000000000000) as shown in FIG. 3. The output (d) of the delay circuit D3 is also "L", whereby it outputs the output even bit (000000000000), not shown. Additionally, both of the inversion signals (e) and (f) from the delay circuits D6 and D7 are "L", and the pieces of the data output from the delay circuits D8 and D9 also are all (000000000000).

At the time of t3: the output (d) of the delay circuit D3 is "H" at the time of t3, whereby the selector S1 selects the output of the inversion/noninversion determination circuit J2. The inversion/noninversion determination circuit J2 determines the bit inversion number of the comparison result between the odd bit (110111010110) and the inversion bit (001011000101) of the even bit (110100111010) sent just before (t2), and the bit inversion number at this time is 7, whereby the output (a) becomes "H". For this, the selector S2 selects the output of the inversion/noninversion determination circuit J4 based on the output (a). The inversion/noninversion determination circuit J4 outputs the comparison result between the inversion bit (001000101001) of the odd bit (110111010110) and the even bit (010110011001). The bit inversion number at this time is 6, whereby the output (b) becomes "H".

Simultaneously, the outputs (c) and (d) of the delay circuits D2 and D3 become "L" and "H" at the time of t3 respectively, whereby the inversion/noninversion circuit P1 outputs the odd bit (101000100100), which is one clock ahead, as the output odd bit as shown in FIG. 3. Also, the inversion/noninversion circuit P2 outputs the inversion bit (001011000101) of the even bit (110100111010) that is one clock ahead, not shown. Additionally, the inversion signals (e) and (f) from the delay circuits D6 and D7 remain "L", and the data output from the delay circuits D8 and D9 is also (000000000000).

At the time of t4: the outputs (c) and (d) of the delay circuit D2 and D3 become "H" and "H" respectively at the time of t4, whereby the inversion/noninversion circuit P1 outputs the inversion bit (001000101001) of the odd bit (110111010110) at the time of t3 shown in FIG. 3 as the output odd bit. At this time, the inversion/noninversion circuit P2 outputs the inversion bit (101001100110) of the even bit (010110011001) at the time of t3, not shown. Also, simultaneously, the delay circuits D8 and D9 output the data that the inversion/noninversion circuits P1 and P2 already output at the time of t3, and the delay circuits D6 and D7 output the inversion signals "L" and "H", which the delay circuits D2 and D3 have already output at the time of t3, as the outputs (e) and (f) respectively.

Similarly hereinafter, by repeating; the process of outputting the determination result of the bit inversion number by comparing the even bit of the previous data in the continuous sequence of the said input video data with the odd bit of the subsequent data in the continuous sequence of the said input video data, and of the determination result of the bit inversion number by comparing the odd bit of the said subsequent data with the even bit of said subsequent data, at the input time of each piece of the data of the input video data that is composed of the parallel data; and the process of taking a control of the inversion/noninversion for the input video data, which is one clock ahead, based on said determination results after one clock, a control of the polarity inversion is taken so that the bit inversion number between the previous data and the subsequent data is equal to or less than half in the state that the parallel data to be output from the delay circuits D8 and D9 became the output video data of the serial data via the parallel-to-serial conversion circuit T2. Simultaneously, the inversion signal to be output from the delay circuits D6 and D7, which becomes the serial data via the parallel-to-serial conversion circuit T1, is output as the serial inversion signal to be synchronized with the video data of said serial data. This inversion signal becomes a control signal for reproducing the original video data at the time of converting the serial data into the parallel data in the reception section of the driving circuit etc. of the display panel as mentioned above.

In the embodiment mentioned above, the inversion or noninversion is controlled of the odd bit and the even bit of the subsequent data that becomes continuous two bits after partial serialization, by the comparison between the even bit of said previous data and the odd bit of said subsequent data, and the comparison between the odd bit of said subsequent data and the even bit of the same data; however the present invention is applicable also in the event that the bit number for serialization was further increased, and the data bus number was curtailed all the more.

Second Embodiment

Figure 4:
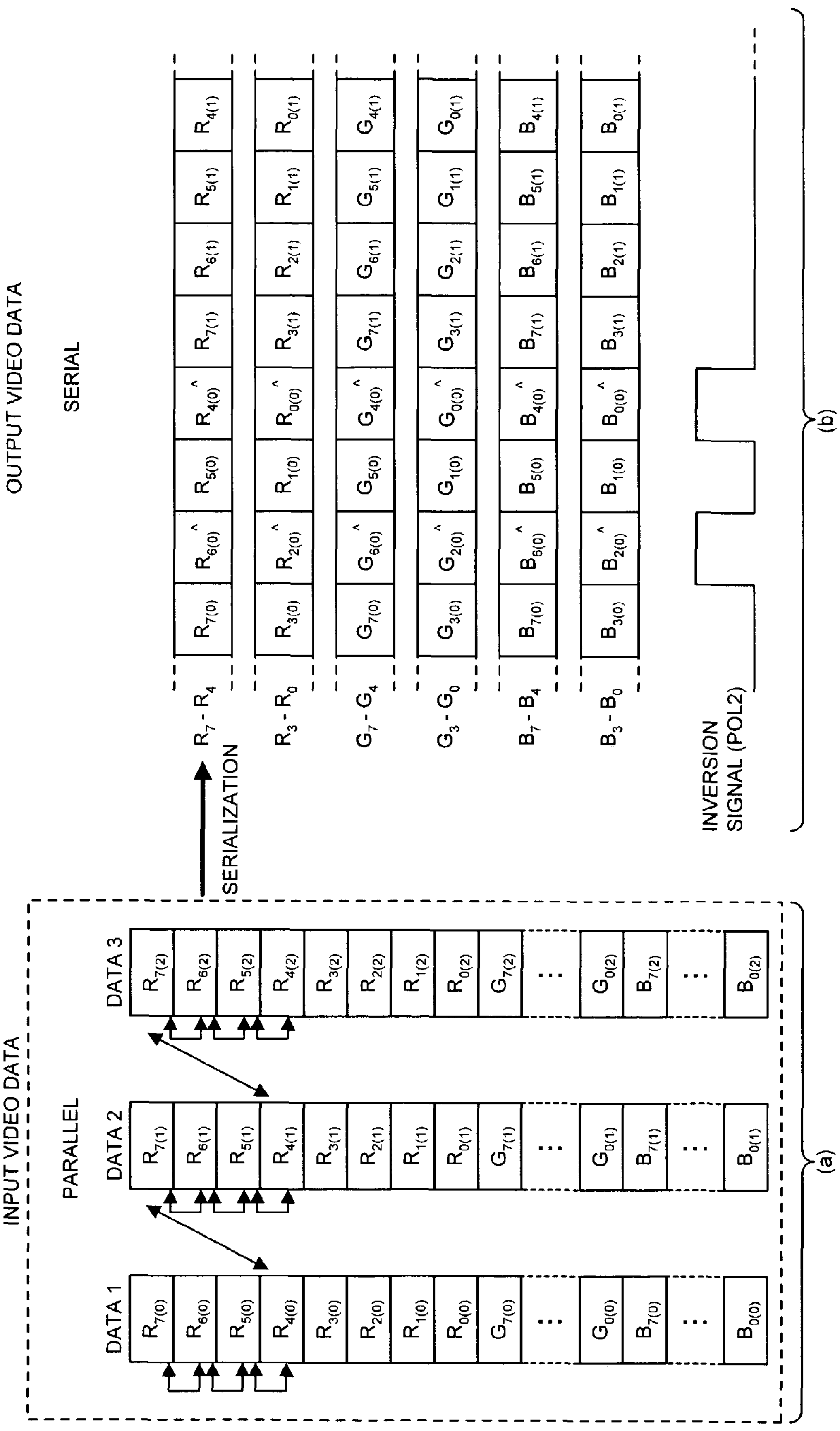
FIG. 4 is a view illustrating the signal form of the video data to be input and output in the second embodiment of the present invention.

FIG. 4 is a view illustrating a signal form of the video data to be input and output in a second embodiment of the present invention. In the second embodiment, an example is shown in which the bit number of the video data to be partially serialized was taken as 4.

The input video data is the data having 3 of the parallel eight bits that correspond to each of brightness signals of red (R), green (G), and blue (B), i.e. gradation display data of 24-bit parallel data. Specifically, as shown in FIG. 4(*a*), the input video data is 24-bit parallel data of R0 to R7, G0 to G7, and B0 to B7, and as shown in FIG. 4(*b*), the output video data is 6 series of the data (for example, R7-R4, R3-R-0, G7-G4, G3-G0, B7-B4, and B3-B0) obtained by serializing (for example R7 (0), R6 (0), R5 (0), R4 (0), R7 (1), R6 (1), R5 (1), R4 (1), . . . , referred to as a "four-bit serial") said 24-bit parallel data in four-bit unit (for example, R7 (1), R6 (1), R5 (1), and R4 (1)).

In this embodiment, the inversion process of the data is performed prior to converting said parallel data (input video data) into the serial data (output video data), and the bit inversion number between time-series pieces of the data that are composed of 6 systems is controlled to be equal to or less than half of the total bit number (6 bits).

Figure 5:
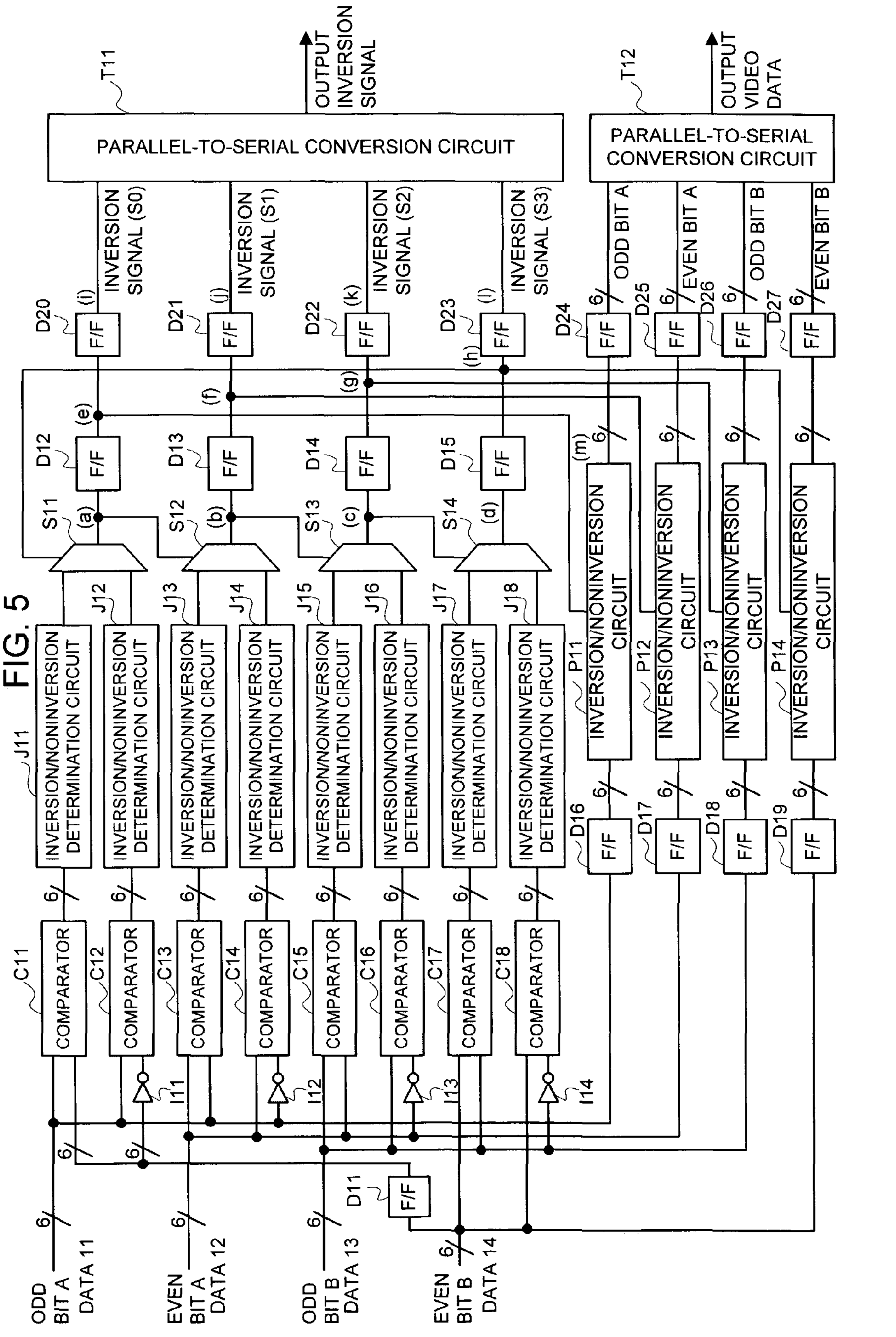
FIG. 5 is a view illustrating the configuration of the second embodiment by the four-bit comparison of the present invention.

FIG. 5 is a view illustrating a configuration of the second embodiment by a four-bit comparison of the present invention.

The circuit configuration of this embodiment, which has: 6 input terminals DATA 11 for inputting the data of every other odd bit out of the 24-bit parallel data of the input video data; 6 input terminals DATA 12 for inputting the data of every other even bit; 6 input terminals DATA 13 for inputting the data of the remaining every other odd bit; and 6 input terminals DATA 14 for inputting the data of the remaining every other even bit, comprises: 6 delay circuits D11 for delaying the data of the remaining every other even bit of the input terminal DATA 14 by one clock (one HCK portion); 6 comparators C11 and C12 each for comparing the data of every other odd bit of the input terminal DATA 11 as against the output of each delay circuit D11 and the data obtained by inverting its output by an inversion circuit I11; 6 comparators C13 and C14 each for comparing the data of every other even bit of the input terminal DATA 12 as against every other odd bit of the input terminal DATA 11 and the data obtained by inverting its odd bit by an inversion circuit I12; 6 comparators C15 and C16 each for comparing the data of the remaining every other odd bit of the input terminal DATA 13 as against the data of every other even bit of the input terminal DATA 12; and 6 comparators C17 and C18 each for comparing the data of the remaining every other even bit of the input terminal DATA 14 as against the data of the remaining every other odd bit of the input terminal DATA 13; and a comparison determination circuit that is composed of inversion/noninversion determination circuits J11 and J12, inversion/noninversion determination circuits J13 and J14, inversion/noninversion determination circuits J15 and J16, and inversion/noninversion determination circuits J17 and J18 for inputting the outputs of 6 comparators C11 and C12 each, 6 comparators C13 and C14 each, 6 comparators C15 and C16 each, and 6 comparators C17 and C18 each respectively to determine the inversion/noninversion, comprises: selectors S11, S12, S13, and S14 for selecting and outputting the outputs of the inversion/noninversion determination circuits J11 and J12, the inversion/noninversion determination circuits J13 and J14, the inversion/noninversion determination circuits J15 and J16, and the inversion/noninversion determination circuits J17 and J18 respectively, said selector S12 being controlled by the output of the selector S11, said selector S13 being controlled by the output of the selector S12, said selector S14 being controlled by the output of the selector S13, said selector S11 being controlled by the output of a delay circuit D15 for delaying the output of the selector S14 by one clock; also, delay circuits D12, D13, and D14 for delaying the outputs of the selector S11, S12, and S13 by one clock respectively; and delay circuits D20, D21, D22,and D23 for delaying the output of each of the delay circuits D12, D13, D14, and D15 by one clock respectively to output inversion signals (i), (j), (k), and (l), and, also comprises: 6 flip-flop circuits (F/F) D16, D17, D18, and D19 each for inputting the data of every other odd bit of the input video data of 6 input terminals DATA 11, the data of every other even bit of 6 input terminals DATA 12, the data of the remaining every other odd bit of 6 input terminals DATA 13, and the data of the remaining every other even bit of 6 input terminals DATA 14 respectively to delay them by one clock; 6 inversion/noninversion circuits P11, P12, P13, and P14 each for taking a control of the inversion/noninversion for the outputs of the delay circuits D12, D13, D14, and D15 respectively; 6 delay circuits D24, D25, D26, and D27 each for delaying the output of each of the inversion/noninversion circuits P11, P12, P13, and P14 by one clock respectively; parallel-to-serial conversion circuit T12 for making a parallel-to-serial conversion of the data of every other odd bit, the data of every other even bit, the data of the remaining every other odd bit, and the data of the remaining every other even bit from the delay circuits D24, D25, D26, and D27; and a parallel-to-serial conversion circuit T11 for making a parallel-to-serial conversion of the outputs (i), (j), (k), and (l) of the delay circuits D20, D21, D22, and D23.

Each circuit function of the second embodiment is substantially the same as that of the first embodiment even though it differs in the bit number etc. of the data to be treated. In short, 6 comparators detect the inversion/noninversion of the parallel six-bit data, the inversion/noninversion determination circuit configuring the comparison determination circuit determines whether or not the bit inversion number is more than 3, and the inversion/noninversion circuit makes an inversion/noninversion of the six-bit data. Also, 4 selectors output the determination result of the inversion/noninversion determination circuit on an upper side (in the event that said control signal is "L") or on a lower side (in the event that said control signal is "H") based on the control signals "L" or "H" respectively, the parallel-to-serial conversion circuit T11 sequentially serializes 4 inversion signals to output them, and the parallel-to-serial conversion circuit T12 sequentially serializes the six-bit data from 6 delay circuits D24, D25, D26, and D27 each in a bit unit to output it.

Figure 6:
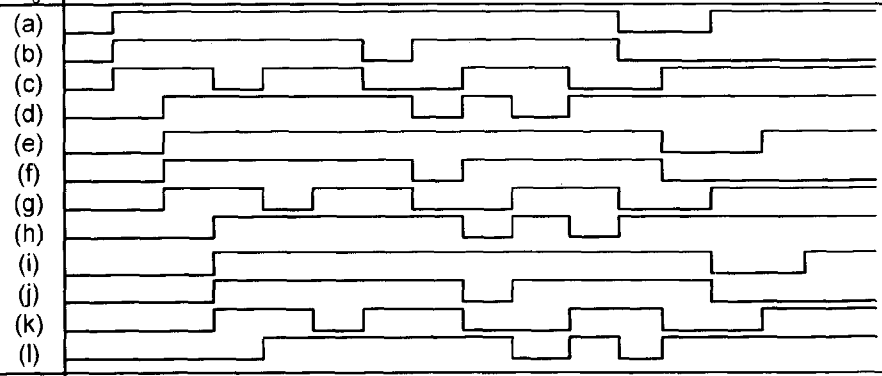
FIG. 6 is a view illustrating the timing chart of the operation of the second embodiment.

FIG. 6 is a view illustrating a timing chart of the operation of this embodiment. The same figure is a timing chart in which the 24-bit parallel data as the input video data was divided into two alternate odd bits A and B, and two alternate even bits A and B, which are each composed of 6 bits, for illustration, the outputs (a) to (l) of the inversion signal are illustrated, and as to the parallel data after the process of the inversion/noninversion, only the odd having 6 bits to be output from the inversion/noninversion circuit P11 is illustrated. Hereinafter, the operation of this embodiment will be explained in the order of the input time t1, t2, t3, . . . of the input video data with an example of FIG. 6.

In the same figure, the pieces of the parallel data up to the time of t1 are all taken as 0, and the D-type flip-flop circuits configuring the delay circuits, into which the parallel data shown in the same figure is input at the time of t2 and afterward, are all taken at zero (reset) state in the initial state. In this case, the outputs (a) to (l) are all "L" at the time of t1.

At the time of t2: the output (h) is "L" in the input state of the data at the time of t2, whereby the selector S11 selects the output of the inversion/noninversion determination circuit J11 for determining the bit inversion number of the comparison result between the odd bit A (110100) and the even bit B (000000) sent just before (t1). The bit inversion number at this time is 3, whereby the output (a) becomes "H". For this, the selector S12 selects the output of the inversion/noninversion determination circuit J14 for determining the bit inversion number of the comparison result between the odd bit A^ (^ indicates the inversion) (001011) and the even bit A (100111). The bit inversion number at this time is 3, whereby the output (b) becomes "H". For this, the selector S13 selects the output of the inversion/noninversion determination circuit J16 for determining the bit inversion number of the comparison result between the even bit A^ (011000) and the odd bit B (000010). The bit inversion number at this time is 3, whereby the output (c) becomes "H". For this, the selector S14 selects the output of the inversion/noninversion determination circuit J18 for determining the bit inversion number of the comparison result between the odd bit B^ (111101) and the even bit B (110100). The bit inversion number at this time is 2, whereby the output (d) remains "L".

Simultaneously, the output (e) of the delay circuit D12 is "L" at the time of t2, whereby the inversion/noninversion circuit P11 outputs the output odd bit A (000000) as shown in FIG. 6. The outputs (f) to (h) of the delay circuits D13 to D15 are also "L", whereby (000000) is output at any case as the output even bit A, the output odd bit B, and the output even bit B, not shown. Additionally, the inversion signals (i) to (l) from the delay circuits D20 to D23 are all "L", and the pieces of the output data of the delay circuits D24 to D27 also are all (000000).

At the time of t3: the output (h) of the delay circuit D15 remains "L" at the time of t3, whereby the selector S11 selects the output of the inversion/noninversion determination circuit J11 for determining the bit inversion number of the comparison result between the odd bit A (101001) and the even bit B (110100) sent just before (t2). In this case, the bit inversion number is 4, whereby the output (a) becomes "H". Hereinafter, similarly, the selectors S12 to S14 output "H", "H", and "H" as the outputs (b) to (d) respectively.

Simultaneously, the output (e) of the delay circuits D12 becomes "H" at the time of t3, and the inversion/noninversion circuit P11 outputs the odd bit A^ (001011) obtained by inverting the odd bit A (110100), which is one clock ahead, as the output odd bit A. Also, the outputs (f) and (g) of the delay circuits D13 and D14 also become "H" respectively, whereby the inversion/noninversion circuits P12 and P13 output the even bit A^ and the odd bit B^ that are the inversion of the even bit A and the odd bit B that are one clock ahead, not shown, respectively. Furthermore, the output (h) of the delay circuit D15 remains "L", whereby the inversion/noninversion circuit P14 outputs the even bit B that is one clock ahead, not shown. Additionally, the inversion signals (i) and (l) from the delay circuits D20 to D23 remain "L", and the output data of the delay circuits D24 to D27 is also (000000).

At the time of t4: at the time of t4, each operation of the selectors S11 to S14 and the inversion/noninversion circuits P11 to P14 is similar to the operation at the time of t2 and t3; however simultaneously, each said piece of the data from the inversion/noninversion circuits P11 to P14, which was output at the time of t3, is output from the delay circuits D24 to D27, and the forgoing "H", "H", "H", and "L" output at the time of t3 are output from the delay circuits D20 to D23 as the inversion signals (i) to (l) indicating the contents of the inversion control of the polarity of each said piece of the data.

Similarly hereinafter, by repeating; the process of outputting the determination result of the bit inversion number by comparing the even bit B of the previous data in the continuous sequence of the said input video data with the odd bit A of the subsequent data in the continuous sequence of the said input video data, of the determination result of the bit inversion number by comparing the odd bit A of the said subsequent data with the even bit A of said subsequent data, of the determination result of the bit inversion number by comparing the even bit A of the said subsequent data with the odd bit B of said subsequent data, and of the determination result of the bit inversion number by comparing the odd bit B of the said subsequent data with the even bit B of said subsequent data, at the input time of each piece of the data of the input video data that is composed of the parallel data; and the process in which the inversion/noninversion circuits P11 to P14 takes a control of the inversion/noninversion based on each said determination result after one clock, a control of the inversion/noninversion is taken at the stage of the parallel data, and a control of the polarity inversion is taken so that the bit inversion number between the previous data and the subsequent data is equal to or less than half in the state that the parallel data to be output from the delay circuits D24 to D27 became the output video data of the serial data via the parallel-to-serial conversion circuit T12. Simultaneously, the inversion signal to be output from the delay circuits D20 to D23, which becomes the serial data via the parallel-to-serial conversion circuit T11, is output as the serial inversion signal to be synchronized with said serialized video data. This inversion signal becomes a control signal for reproducing the original video data at the time of converting the serial data into the parallel data in the reception section of the driving circuit etc. of the display panel as mentioned before.

Figure 7:
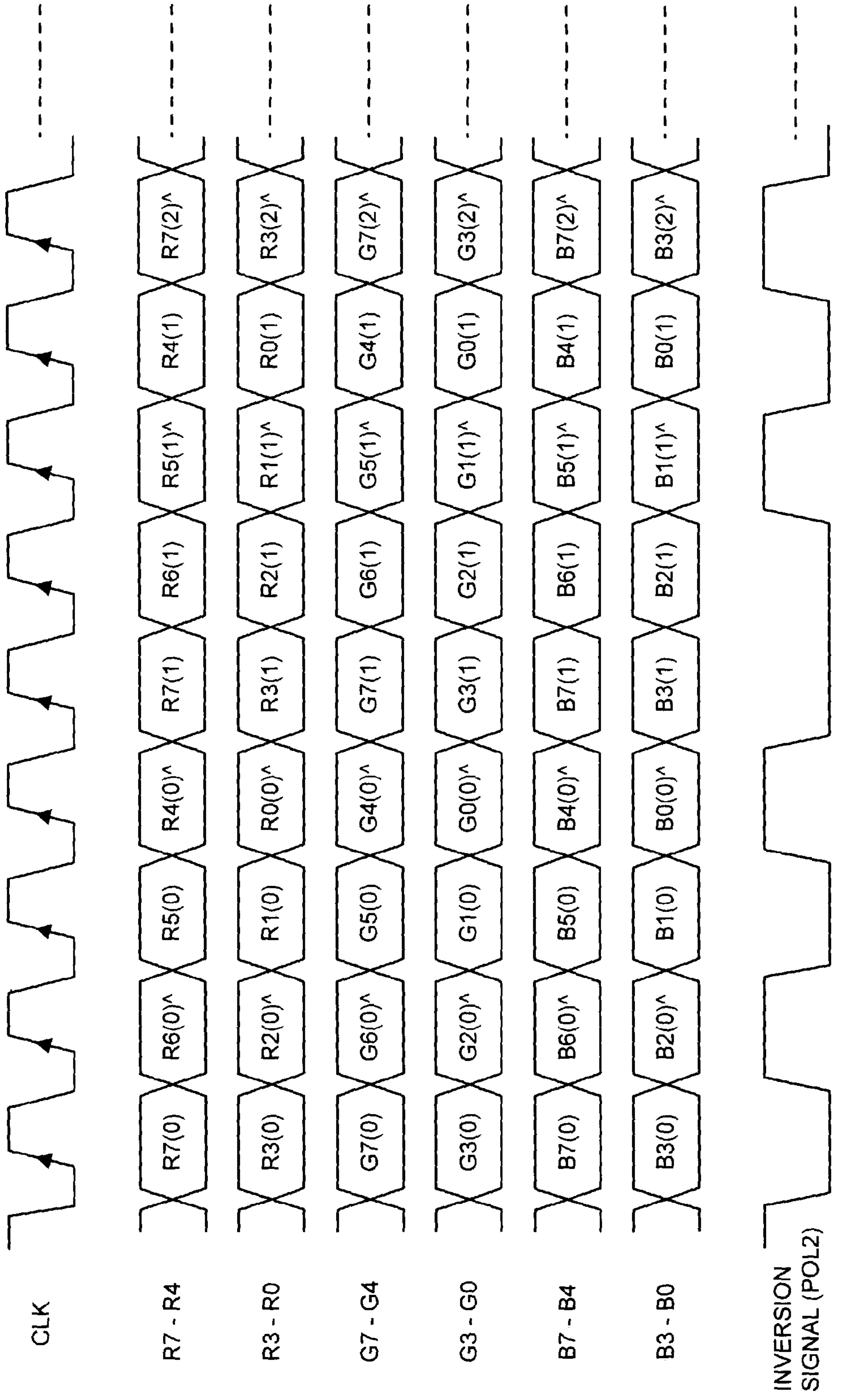
FIG. 7 is a view illustrating the timing chart of the serial data of the second embodiment.
Figure 8:
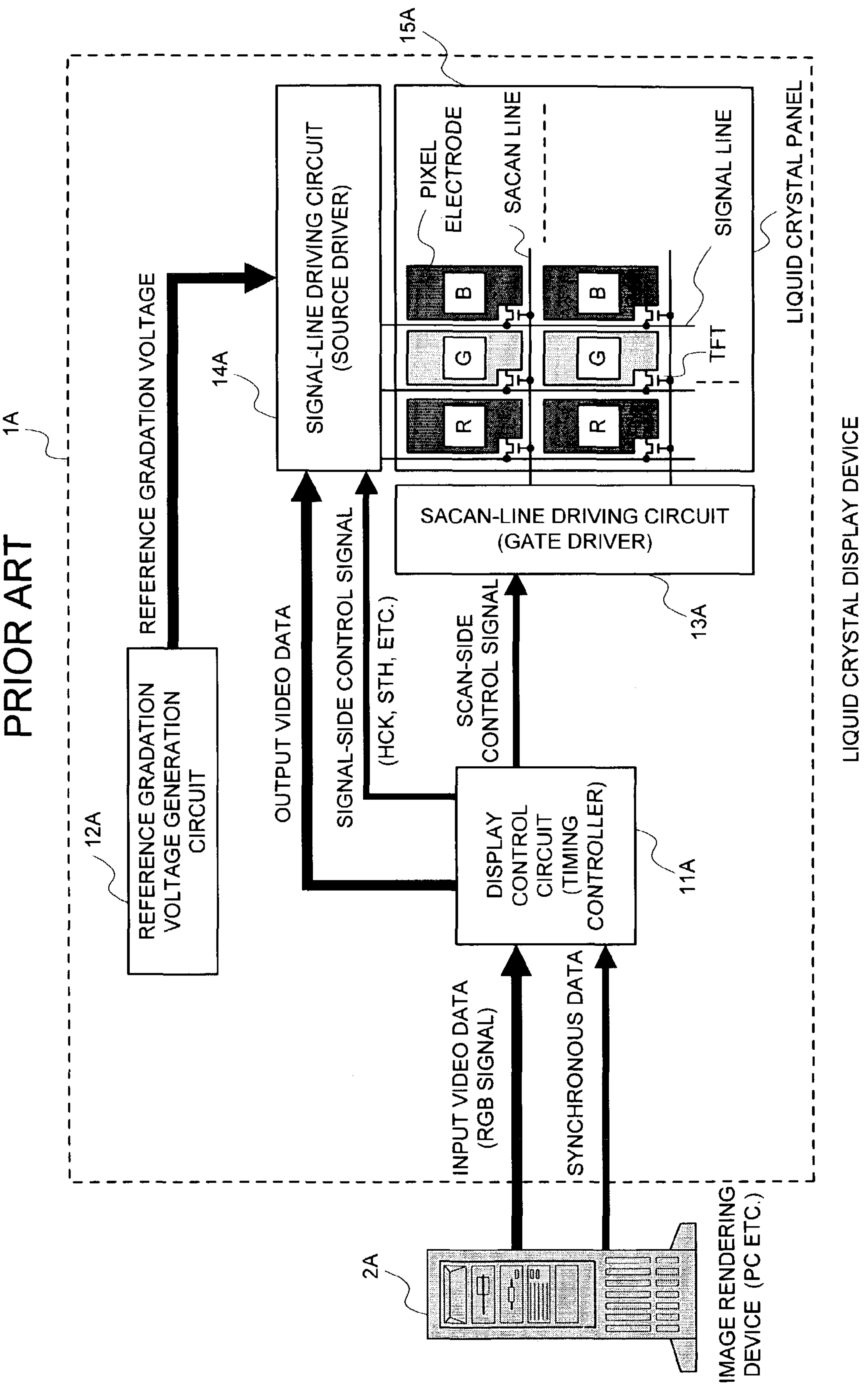
FIG. 8 PRIOR ART
FIG. 8 is a diagram illustrating the system configuration of the conventional liquid crystal display device.
Figure 9:
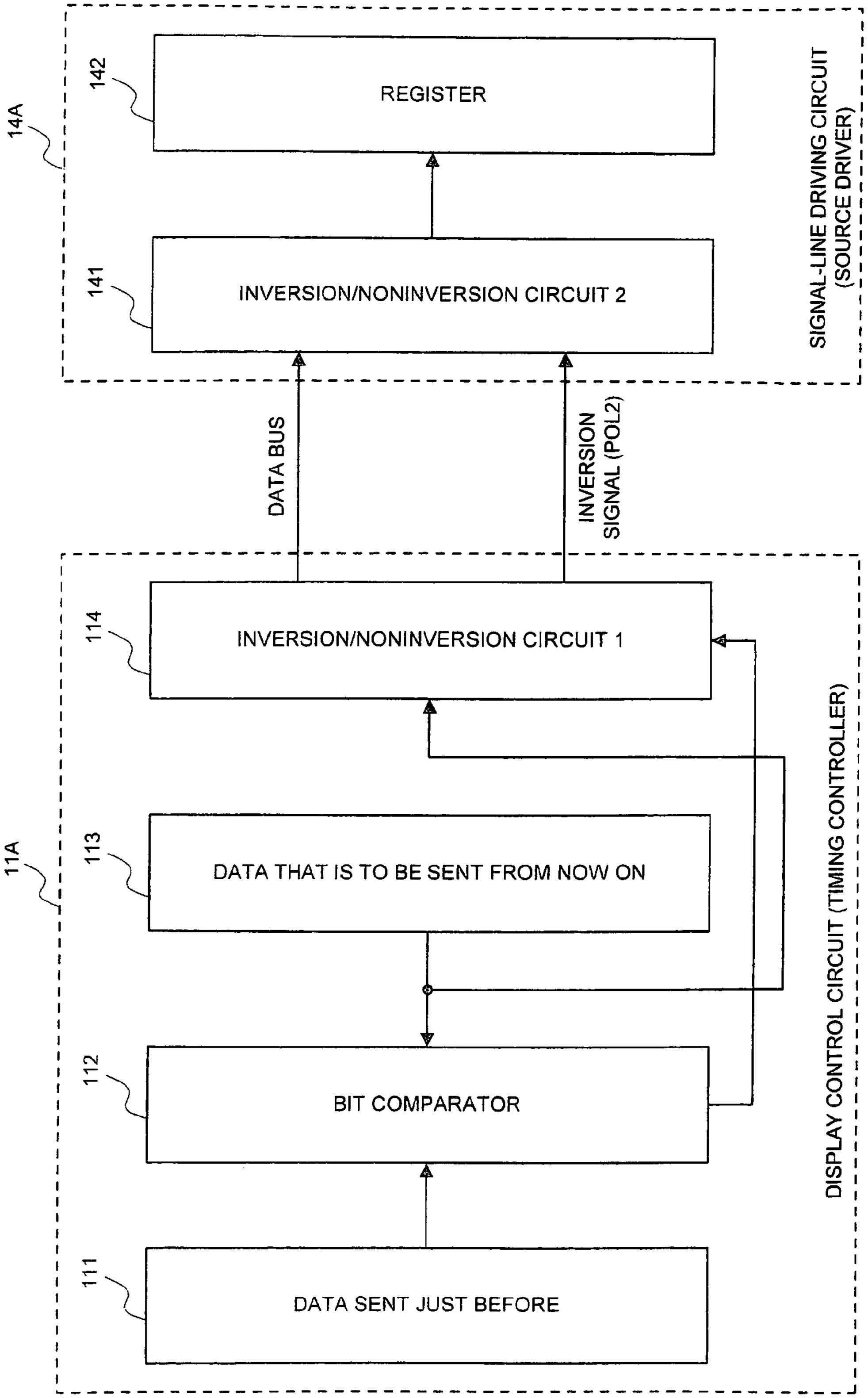
FIG. 9 PRIOR ART
FIG. 9 is a conceptual view illustrating the control of the bit inversion number in the data transfer between the display control circuit and the signal-line driving circuit.
Figure 10:
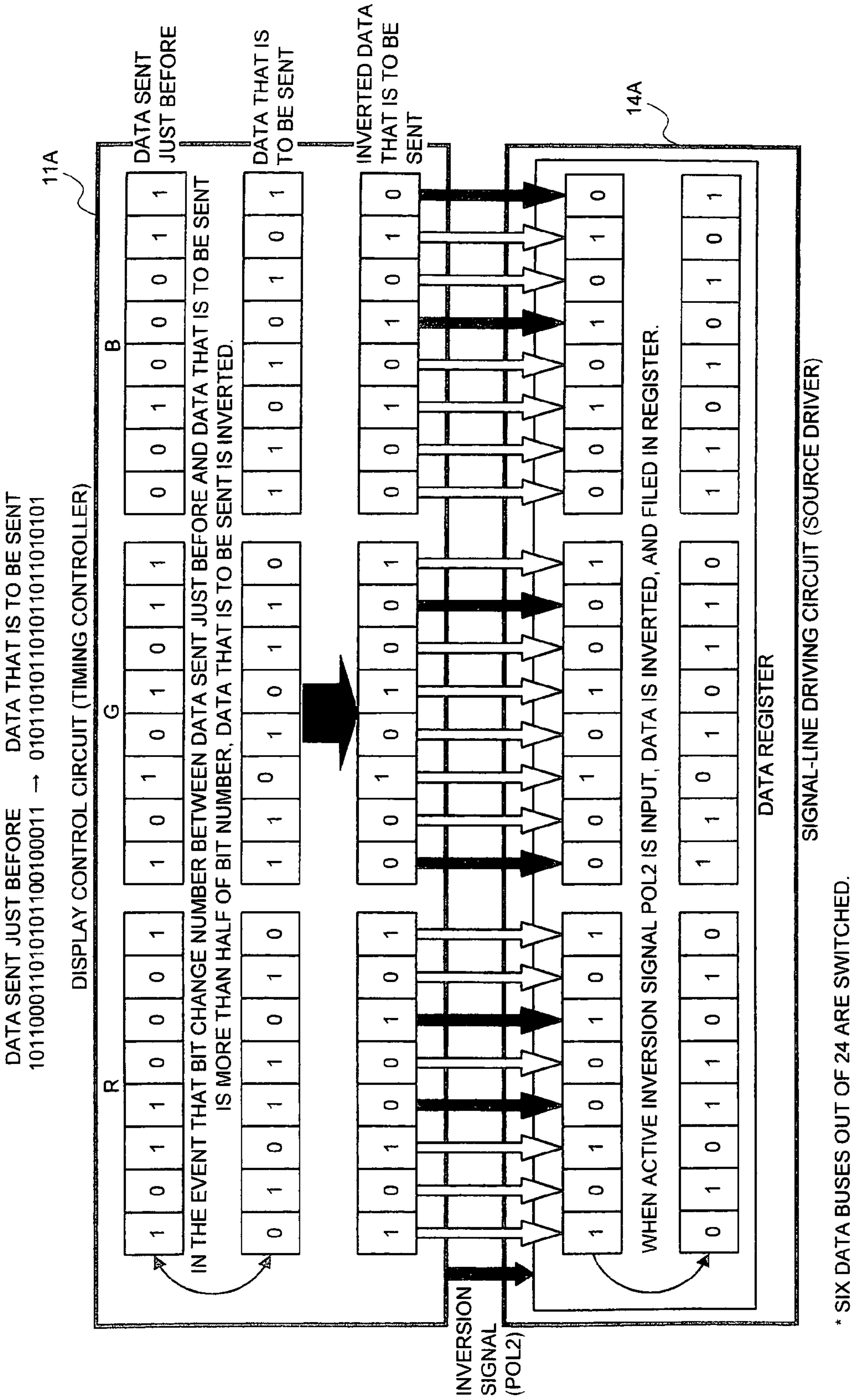
FIG. 10 PRIOR ART
FIG. 10 is a conceptual view illustrating the data transfer example.
Figure 11:
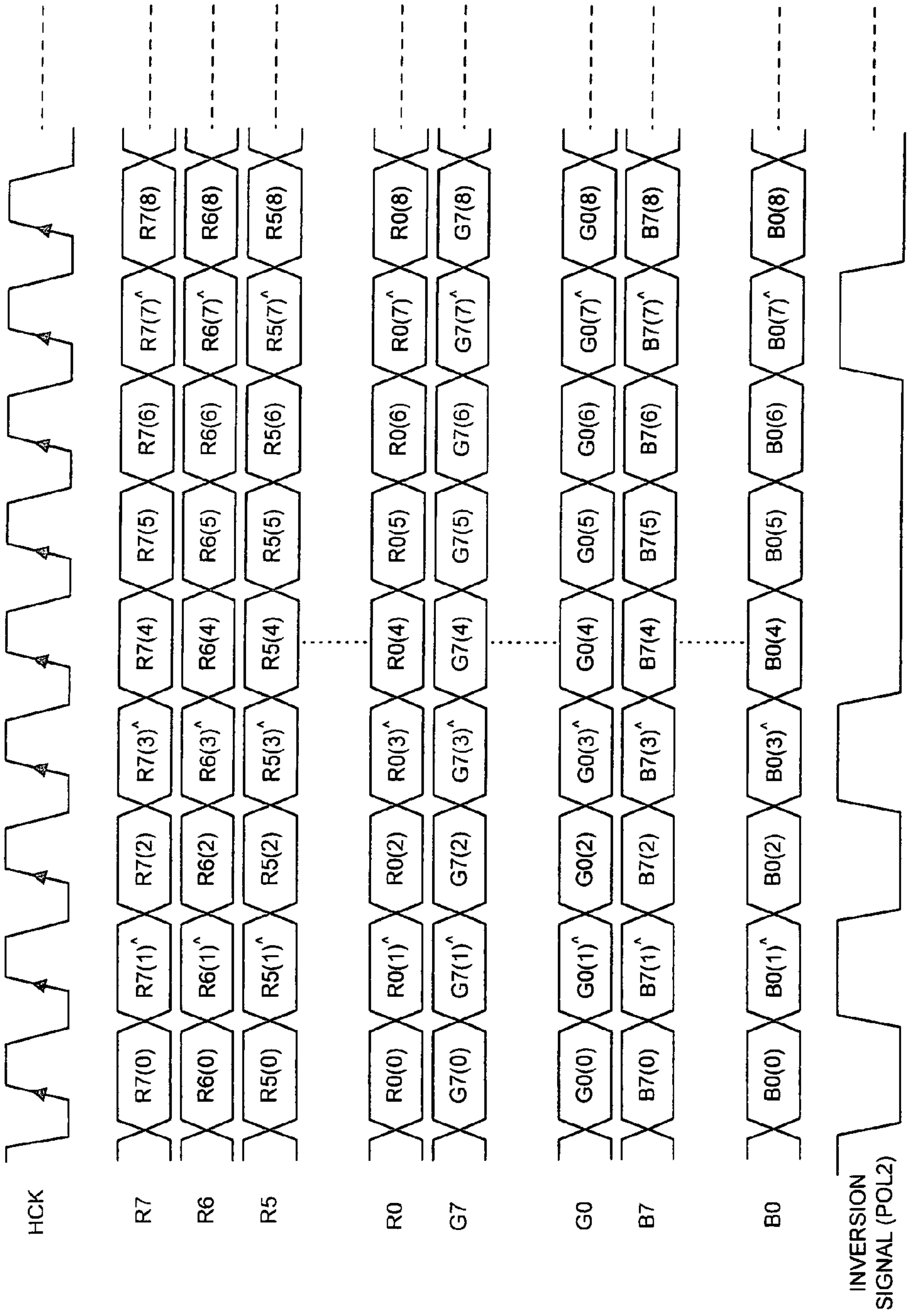
FIG. 11 PRIOR ART
FIG. 11 is a view illustrating the example of the video data obtained by taking a control of the bit inversion for the 24-bit input video data of red (R), green (G), and blue (B)
Figure 12:
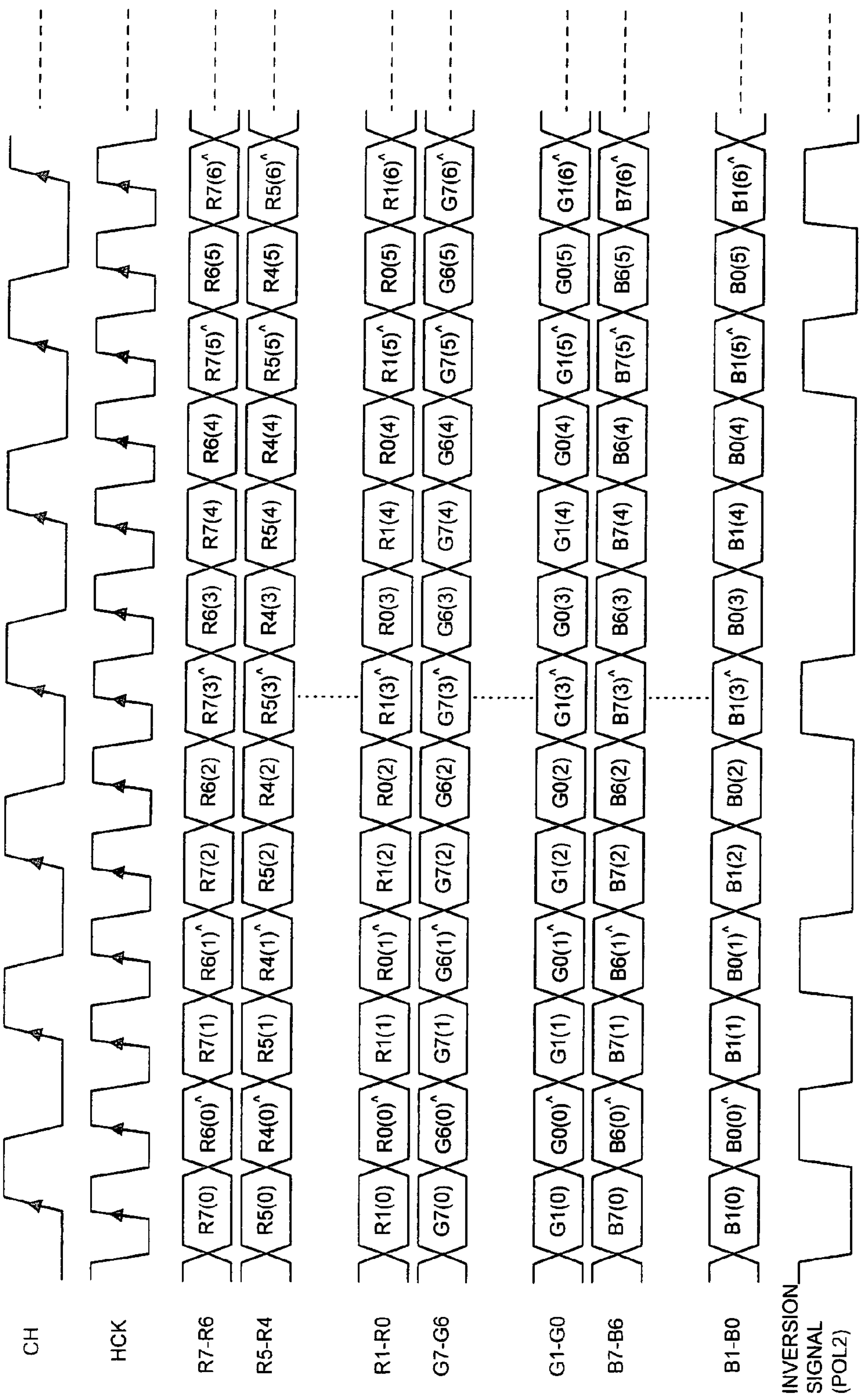
FIG. 12 PRIOR ART
FIG. 12 is a view illustrating a timing chart of the data form of the data bus and the inversion signal in the event of making a serial transfer, as one example, at a rate of 2 to 1.

FIG. 7 is a view illustrating a timing chart of the serial data of the second embodiment. By serialization in a four-bit unit, the serial data number became ¼, and the data bus number was reduced to 6.

Another Embodiment

In the embodiments above, an example of the two-bit serial and the four-bit serial was explained as the partial serialization of the video data; however it is apparent that the present invention is applicable for the parallel data of the input video data, as a rule, in making $2^m$-bit serialization.

For example, in the event of taking the input video data of a $3\times2^n$-bit parallel as an object like the case in which color video data is treated, in the video data transfer for serializing the above input video data in a $2^m$-bit (n, m: natural numbers, n>m) unit to transfer it to the signal-line driving circuit such as the source driver as the output video data of a $3\times2^{(n-m)}$-bit parallel, it is possible to employ a technique of taking a control for making an inversion or a noninversion of the polarity of the succeeding bit for each of $3\times2^{(n-m)}$ bits of said input video data that corresponds to $3\times2^{(n-m)}$-bit parallel data of said output video data so that the bit inversion number between the previous data and the subsequent data in the continuous sequence of a $3\times2^{(n-m)}$-bit parallel of said output video data is (½) $3\times2^{(n-m)}$ ($=3\times2^{(n-m-1)}$) or less.

Also, the display control circuit etc. in this case is possible to realize, by increasing the comparators, the inversion/noninversion determination circuits, the selectors, the inversion/noninversion circuits, and the parallel-to-serial conversion circuits, etc. shown in FIG. 2 and FIG. 5, based on the principle of the present invention.

Furthermore, an example of the combination of the odd bit and the even bit having a two-bit unit, and the combination of the continuous four-bit unit was shown as the partial serialization of the input video data; however these combinations are possible to arbitrarily establish only by conforming interconversion algorithm of the parallel-to-serial conversion on the display control circuit side with that of the serial-to-parallel conversion on the signal-line driving circuit (source driver) side. This is similarly possible, as a rule, in serialization in a $2^m$-bit unit.

Also, in the embodiments above, it is impossible prior to serialization to determine whether or not the previous data at the time of serialization, which was the data that became a reference for comparison, was inverted because the process of the inversion or the noninversion is performed for the parallel data prior to the serial conversion, whereby, for the constitutional reason of the device, the configuration is made so that the inversion data and the noninversion data of the previous data are used respectively to compare each piece of the data with the subsequent data; however it is not necessarily essential to have the configuration in which the inversion data and the noninversion data are pre-prepared, but it is apparently possible to have the process configuration in which the inversion data is appropriately generated for comparison, based on the determination result of the bit inversion number.

As explained above, the present invention relates to the transfer of the input video data for the driving circuit etc. of the liquid crystal display device, and relates to the video data of which the data bus number was reduced by partially serializing the input video data of the above transfer data, and its principle is that, in the input video data to be partially serialized with the parallel-to-serial conversion, in short, in the data in the parallel state prior to the partial serialization, by fetching the pieces of the data that come into a relation of the previous data and the subsequent data after serialization for comparison to make an inversion or a noninversion of the parallel data equivalent to the above subsequent data based on its result, as to the subsequent data of the video data after the partial serialization, its bit inversion number relating to the previous data is controlled not to become more than half thereof, and when said inversion or noninversion is made, the inversion signal, which is information of its inversion or noninversion, is also generated in parallel correspondingly to said parallel data. And, by serializing respective pieces of the data, the partially serialized video data and the inversion signal are to be output.

These pieces of the data are transferred to the signal-line driving circuit such as the source driver of the liquid crystal panel, and the partially serialized video data is returned to be in a state prior to controlling the inversion/noninversion of the polarity with the inversion signal, and is restored to the original input video data of the parallel data with a known serial-to-parallel conversion that corresponds to the parallel-to-serial conversion. Needless to say, the operation is performed of converting the restored input video data into the gradation voltage, and of supplying it to a pixel electrode via the signal line and a TFT.

In accordance with the present invention, the configuration was made so that after the input video data of the parallel data was compared/inverted, a parallel-to-serial conversion for making partial serialization was made, and that the output video data having the parallel bit number curtailed, and the inversion signal having inversion information of the above output video data were generated, and transferred to the signal-line driving circuit such as the source driver of the liquid crystal display device, whereby a similar data bus waveform is realized, and the operational speed of the data process for restraining the bit inversion number is kept from becoming high, as compared with the configuration in which the comparison and the inversion/noninversion of the data are made after making a parallel-to-serial conversion like the conventional display control circuit.

For this, the data bus number of the output video data is possible to curtail, the bit inversion number of the data can be restrained, thus enabling restraint of the electromagnetic radiation from the above data bus and the electromagnetic radiation caused by the switching operation in controlling the inversion/noninversion of the data, and prevention of occurrence of the electromagnetic interference.

What is claimed is:

1. A display control circuit for inputting input video data that is composed of parallel data to transfer video data obtained by serializing each piece of the input video data in a two-bit unit of a first bit and a second bit as output video data to a signal-line driving circuit, said display control circuit characterized in having:

first comparison determination means for comparing a noninversion bit of the second bit of previous data with a noninversion bit of the first bit of subsequent data to output a determination result as to whether or not the bit inversion number is more than half;

second comparison determination means for comparing an inversion bit of the second bit of the previous data with the noninversion bit of the first bit of the subsequent data to output a determination result as to whether or not the bit inversion number is more than half;

third comparison determination means for comparing the noninversion bit of the first bit of the subsequent data with the noninversion bit of the second bit of the subsequent data to output a determination result as to whether or not the bit inversion number is more than half;

fourth comparison determination means for comparing the inversion bit of the first bit of the subsequent data with the noninversion bit of the second bit of the subsequent data to output a determination result as to whether or not the bit inversion number is more than half;

selection means that is composed of first selection means and second selection means for selecting/outputting the output of either of the determination results of said first comparison determination means and said second comparison determination means, and the output of either of the determination results of said third comparison determination means and said fourth comparison determination means respectively, said first selection means being controlled by the output of the second selection means based on of the input video data that is one piece of the data ahead, said second selection means being controlled by the output of the first selection means;

output means for, based on the output of said first selection means and the output of said second selection means of said selection means, making an inversion or a noninversion of the first bit of the subsequent data and the second bit of the subsequent data respectively to output them, and for outputting an inversion signal indicating said inversion or noninversion; and a parallel-to-serial conversion circuit for serializing the output of said output means in a two-bit unit to output it as the output video data and an output inversion signal.

2. A display control circuit comprising:

a first comparator which is configured to compare a noninversion bit of the $2^m$-th bit of previous data having a $2^m$-bit unit with the noninversion bit of the first bit of subsequent data having a $2^m$-bit unit to determine whether the bit inversion number is more than half, a second comparator which is configured to compare an inversion bit of the $2^m$-th bit of the previous data having a $2^m$-bit unit with the noninversion bit of the first bit of the subsequent data having a $2^m$-bit unit to determine whether the bit inversion number is more than half, a third comparator which is configured to compare the noninversion bit of the first bit of the subsequent data having a $2^m$-bit unit with the noninversion bit of the second bit of the subsequent data having a $2^m$-bit unit to determine whether the bit inversion number is more than half;

a fourth comparator which is configured to compare the inversion bit of the first bit of the subsequent data having a $2^m$-bit unit with the noninversion bit of the second bit of the subsequent data having a $2^m$-bit unit to determine whether the bit inversion number is more than half;

$2\times2^{m-1}$-th comparators which are configured to compare the noninversion bit of the $2^{m-1}$-th bit of the subsequent data having a $2^m$-bit unit with the noninversion bit of the $2^m$-th bit of the subsequent data having a $2^m$-bit unit to determine whether the bit inversion number is more than half, $2\times2^m$-th determining units which are configured to compare the inversion bit of the $2^{m-1}$-th bit of the subsequent data having a $2^m$-bit unit with the noninversion bit of the $2^m$-th bit of the subsequent data having a $2^m$-bit unit to determine whether the bit inversion number is more than half;

a selector comprising a first selector, a second selector, . . . , and a $2^m$-th selector, which are configured to select and output the output of either of the determination results of said first and second determining units, the output of either of the determination results of said third and fourth determining units, . . . , and the output of either of the determination results of said $2\times2^{m-1}$-th and said $2\times2^m$-th comparators, respectively, said first selector being controlled by the output of the $2^m$-th selector based on the input video data that is one piece of the data ahead, said second selector being controlled by the output of the first selector, . . . , said $2^m$-th selector being controlled by the output of the $2^{m-1}$-th selector;

an output circuit, which is configured to, based on the outputs of said first selector, said second selector, . . . , and said $2^m$-th selector of said selectors, make an inversion or a noninversion of the first bit, the second bit, . . . , and the $2^m$-th bit of said subsequent data, respectively, and to output them along with an inversion signal indicating said inversion or noninversion; and a parallel-to-serial conversion circuit which is configured to serialize the output of said output means in a $2^m$-bit unit and to output the serialized data as the output video data and an output inversion signal.

3. A liquid crystal display device comprising: a display control circuit for inputting input video data that is composed of parallel data to transfer video data obtained by serializing each piece of the input video data in a two-bit unit of a first bit and a second bit as output video data; and a signal-line driving circuit for inputting said output video data, said liquid crystal display device characterized in that said display control circuit comprises:

first comparison determination means for comparing a noninversion bit of the second bit of previous data with the noninversion bit of the first bit of subsequent data to output a determination result as to whether or not the bit inversion number is more than half;

second comparison determination means for comparing an inversion bit of the second bit of the previous data with the noninversion bit of the first bit of the subsequent data to output a determination result as to whether or not the bit inversion number is more than half;

third comparison determination means for comparing the noninversion bit of the first bit of the subsequent data with the noninversion bit of the second bit of the subsequent data to output a determination result as to whether or not the bit inversion number is more than half;

fourth comparison determination means for comparing the inversion bit of the first bit of the subsequent data with the noninversion bit of the second bit of the subsequent data to output a determination result as to whether or not the bit inversion number is more than half;

selection means that is composed of first selection means and second selection means for selecting/outputting the output of either of the determination results of said first comparison determination means and said second comparison determination means, and the output of either of the determination results of said third comparison determination means and said fourth comparison determination means respectively, said first selection means being controlled by the output of the second selection means based on the input video data that is one piece of the data ahead, said second selection means being controlled by the output of the first selection means;

output means for, based on the output of said first selection means and the output of said second selection means of said selection means, making an inversion or a noninversion of the first bit of the subsequent data and the second bit of the subsequent data respectively to output them, and for outputting an inversion signal indicating said inversion or noninversion; and a parallel-to-serial conversion circuit for serializing the output of said output means in a two-bit unit to output it as the output video data and an output inversion signal.

4. A liquid crystal display device comprising a display control circuit as claimed in claim 2.

5. A display control circuit comprising:

a first comparator which is configured to compare a noninversion bit of second bits of a first data with a noninversion bit of first bits of a second data following said first data to output a first determination result as to whether the bit inversion number is more than half;

a second comparator which is configured to compare an inversion bit of said second bits of said first data with the noninversion bit of said first bits of said second data to output a second determination result as to whether the bit inversion number is more than half;

a third comparator which is configured to compare the noninversion bit of first bits of said second data with the noninversion bit of the second bits of said second data to output a third determination result as to whether the bit inversion number is more than half;

a fourth comparator which is configured to compare the inversion bit of said first bits of said second data with the noninversion bit of the second bits of said second data to output a fifth determination result as to whether the bit inversion number is more than half;

a first selector which is configured to selectively output one of said first and second determination results, said first selector being controlled by the output of a second selector;

a second selector which is configured to selectively output one of said third and fourth determination results, said second selector being controlled by the output of the first selector;

an output circuit which is configured to output an inversed signal or a non-inverted signal of the first bits of the second data based on the output of said first selector and an inversed signal or a non-inverted signal of the second bits of the second data based on the output of said second selector, and to output an inversion signal indicating the inversion or non-inversion; and a parallel-to-serial conversion circuit which is configured to serialize the output of said output circuit in a two-bit unit to output it as the output video data and an output inversion signal.

6. A liquid crystal display device comprising the display control circuit as claimed in claim 5.

* * * * *